US009360866B2

(12) United States Patent
Gutierrez-Castaneda et al.

(10) Patent No.: US 9,360,866 B2
(45) Date of Patent: Jun. 7, 2016

(54) METHOD FOR DETERMINING THE VERTICAL POINT FOR SWITCHING FROM A MANUAL PILOTING MODE TO A GUIDED MODE

(71) Applicant: THALES, Courbevoie (FR)

(72) Inventors: Manuel Gutierrez-Castaneda, Toulouse (FR); Bertrand Caudron De Coquereaumont, Tournefeuille (FR); Xavier Jeanjean, Toulouse (FR)

(73) Assignee: Thales, Courbevoie (FR)

( * ) Notice: Subject to any disclaimer, the term of this patent is extended or adjusted under 35 U.S.C. 154(b) by 0 days.

(21) Appl. No.: 14/747,940

(22) Filed: Jun. 23, 2015

(65) Prior Publication Data

US 2015/0378358 A1    Dec. 31, 2015

(30) Foreign Application Priority Data

Jun. 27, 2014    (FR) ...................................... 14 01454

(51) Int. Cl.
| | |
|---|---|
| *G05D 1/00* | (2006.01) |
| *G05D 1/06* | (2006.01) |
| *B64C 13/18* | (2006.01) |
| *B64C 13/22* | (2006.01) |
| *G05D 1/04* | (2006.01) |
| *G08G 5/00* | (2006.01) |

(52) U.S. Cl.
CPC .............. *G05D 1/0061* (2013.01); *B64C 13/18* (2013.01); *B64C 13/22* (2013.01); *G05D 1/042* (2013.01); *G05D 1/0607* (2013.01); *G08G 5/0047* (2013.01); *G08G 5/003* (2013.01)

(58) Field of Classification Search
CPC .............................. G05D 1/0061; G05D 1/042
See application file for complete search history.

(56) References Cited

U.S. PATENT DOCUMENTS

| | | | | |
|---|---|---|---|---|
| 2,819,030 | A * | 1/1958 | Christensen | B64C 13/24 244/76 R |
| 2,979,289 | A * | 4/1961 | Abzug | G05D 1/12 244/193 |
| 3,007,656 | A * | 11/1961 | Miller | G05D 1/0816 244/180 |
| 3,386,689 | A * | 6/1968 | Parker | G05D 1/0061 244/178 |
| 3,743,221 | A * | 7/1973 | Lykken | G05D 1/0676 244/180 |
| 5,940,013 | A * | 8/1999 | Vladimir | B64D 43/00 340/945 |
| 6,062,513 | A * | 5/2000 | Lambregts | G05D 1/0638 244/175 |
| 2003/0058134 | A1 | 3/2003 | Sherry et al. | |
| 2004/0153220 | A1 * | 8/2004 | Kubica | B64C 13/18 701/11 |
| 2005/0075763 | A1 * | 4/2005 | Brigode | B64C 13/18 701/11 |
| 2006/0164260 | A1 * | 7/2006 | Berthou | B64D 43/00 340/945 |

(Continued)

Primary Examiner — Thomas Tarcza
Assistant Examiner — Alex C Dunn
(74) Attorney, Agent, or Firm — Baker & Hostetler LLP

(57) ABSTRACT

A method for determining a switch-over vertical point from which an aircraft, having a current position, and flying a current vertical trajectory according to a manual piloting mode having an altitude setpoint, denoted target altitude, loaded by the pilot, switches to a piloting mode guided by a flight management system, in order to rejoin a predefined flight plan having a set of initial altitude constraints, comprising: calculating a first predicted vertical trajectory, determining a first point of intersection between the first predicted trajectory and the target altitude, determining a second predicted trajectory, determining the switch-over vertical point belonging to the first predicted vertical trajectory, based on any incompatible constraints, and as the intersection between the first predicted vertical trajectory and a predicted vertical trajectory calculated by integration of the dynamic flight equations by applying calculation hypotheses for a piloting mode guided by a flight management system.

18 Claims, 17 Drawing Sheets

(56) References Cited

U.S. PATENT DOCUMENTS

| | | |
|---|---|---|
| 2009/0076717 A1 | 3/2009 | Goutelard et al. |
| 2009/0314896 A1 | 12/2009 | Rouquette et al. |
| 2010/0324812 A1 | 12/2010 | Sacle et al. |
| 2012/0083946 A1* | 4/2012 | Maldonado ............ G06Q 10/06 701/3 |
| 2013/0085669 A1* | 4/2013 | Bailey ................. G08G 5/0039 701/467 |

* cited by examiner

METHOD FOR DETERMINING THE VERTICAL POINT FOR SWITCHING FROM A MANUAL PILOTING MODE TO A GUIDED MODE

CROSS-REFERENCE TO RELATED APPLICATION

This application claims priority to foreign French patent application No. FR 1401454, filed on Jun. 27, 2014, the disclosure of which is incorporated by reference in its entirety.

FIELD OF THE INVENTION

The invention relates to the field of the management of the flight of an aircraft and, more particularly, to the passage between various piloting modes for an aircraft, depending on the flight constraints. More particularly, the invention relates to the field of the management of the vertical trajectories and predictions.

BACKGROUND

Flight management systems are known from the prior art that are designed for preparing a flight plan, then closed-loop controlling the aircraft over the latter.

During the preparation of the flight or during a re-routing, the crew inputs their flight plan into a dedicated computer: the FMS (Flight Management System).

FIG. 1 shows the various components of an FMS having the functions listed hereinbelow, described in the standard ARINC 702 (Advanced Flight Management Computer System, December 1996): they normally provide all or part of the functions for:

- Navigation LOCNAV, 170, for performing the optimum localization of the aircraft depending on the geo-localization means (GPS, GALILEO, VHF radio beacons, inertial guidance systems);
- Flight plan FPLN, 110, for inputting the geographical elements forming the skeleton of the route to be followed (departure and arrival procedures, waypoints, airways);
- Navigation database NAVDB 130, for constructing geographical routes and procedures using data included in the databases (points, beacons, interception or altitude legs, etc.);
- Performance database, PRF DB 150, containing the aerodynamic and engine parameters of the aircraft.
- Lateral trajectory TRAJ, 120: for constructing a continuous trajectory based on the points of the flight plan, complying with the aircraft performance characteristics and the confinement constraints (RNP);
- Predictions PRED, 140: for constructing a vertical profile optimized over the lateral trajectory;
- Guidance, GUID 160, for guiding the aircraft in the lateral and vertical planes over its 3D trajectory, while at the same time optimizing the speed;
- Digital data link DATALINK, 180 for communicating with the control centres and the other aircrafts.

A flight plan is composed of a list of "legs" in the AEEC ARINC 424 format. A leg consists of a termination (which may be of navigation point or "waypoint", a termination altitude, an interception with another leg, a beacon radial location, a distance with respect to a beacon) and of a path to be followed in order to arrive at the termination (orthodromic route, loxodromic route, imposed arrival heading for example). A flight plan is generated starting from procedures and from points, stored in the navigation database 130, structured according to the aforementioned ARINC 424 standard. The procedures are composed of a set of legs. These digital procedures are produced from data supplied by the states, corresponding to the procedures in force in the air space being traversed. For example, in order to construct a flight plan, the pilot chooses various procedures indexed by a name, and various points. The FMS then extracts these procedures and points from the database, then carries out an a concatenation of the successive procedures in order to generate the flight plan.

A flight plan may be used by the FMS in order to perform the calculation of the trajectories and of the predictions, and in order to closed-loop control the aircraft.

In a flight plan, the prior art mentions 2 particular points:
- The next waypoint, called "TO waypoint", corresponding to the first leg in front of the aircraft
- The preceding waypoint, called "FROM waypoint", corresponding to the last point which has been passed
  (thus, when the aircraft passes a "TO waypoint", it becomes FROM and the next point the TO (often called "NEXT waypoint" becomes the new "TO waypoint".

Thus, using the flight plan defined by the pilot, the lateral trajectory is calculated by the FMS. On this lateral trajectory, the FMS optimizes a vertical trajectory (in altitude and speed), taking into account any constraints on altitude, on speed, on time.

One example of vertical trajectory 20 is given in FIG. 2. A vertical trajectory is illustrated by a evolution of the altitude h as a function of a curvilinear abscissa x along the trajectory.

A vertical trajectory is a valuable prediction tool for the crew. The vertical predictions carried out by the FMS are made based on the initial data:
- Aircraft current state (altitude, speed, position, on-board fuel and weight of the aircraft, etc.)
- Flight plan present in front of the aircraft
- Current Guidance mode ("managed" or "selected"—see below)

The Predictions are calculated from one to the next along the pre-calculated lateral trajectory, and up to the end of the flight plan, for example by integration of the equations for the dynamic characteristics of the aircraft, with integration steps sizes designed to obtain the correct precision. These predictions typically calculate:
- The predicted altitude of passage
- The predicted speed of passage (from this, the predicted time is deduced)
- The predicted wind at the waypoint
- The predicted remaining fuel (and hence the weight of the aircraft).

According to the prior art, the complete calculated vertical profile is broken down into three phases:
- a climbing phase 10 from the departure airport to a first altitude flight level is calculated starting from the takeoff runway and up to the point denoted "Top of Climb" (T/C), which corresponds to reaching the start of the cruising flight level. This first part is determined by integrating the dynamic equations (reference needed) along the lateral trajectory and in the forward direction (predictions starting from the runway up to the T/C): these are then referred to as "Forward" predictions.
- a cruising phase 11 consisting of a succession of altitude flight levels to be reached and associated altitude change points, denoted "steps", generally localized in curvilinear abscissa x along the vertical profile, for example with respect to the remaining distance to be travelled in order to arrive at the destination ("distance to destination"). The cruising path is calculated from the T/C to the point of start of descent, denoted "Top of Descent" (T/D) which corresponds to the end of the cruising phase. This part is determined by integrating the dynamic equations along the lateral trajectory and in the forward direction (predictions starting from the T/C up to the T/D). The predictions are also denoted "Forward".

a descent phase 12 from the last altitude flight level to the arrival airport calculated from the T/D to the final destination. It is calculated in 2 parts.

A first part consists in calculating a descent profile Prof (altitude/speed) by starting from the destination and by integrating in a reverse direction up to the end of the cruise path, denoted "backward" predictions. This profile Prof is fixed in order to guarantee that the aircraft following it will indeed finish its flight on the runway (in altitude/speed). This calculation allows the time and fuel consumed to be determined "as a countdown", together with the wind.

A second part is composed of "forward" predictions starting from the aircraft state up to the destination. They comprise altitude, speed, time, fuel and wind "forward" predictions by propagating the aircraft state.

As long as the aircraft is not in the descent phase (i.e. as long as it is on the climbing and cruising trajectory), the descent profile and the descent predictions are identical (i.e. the aircraft is predicted along the profile), as long as the profile is flyable.

With regard to the closed-loop control of the aircraft, there exist several flight plans managed by the FMS. The active flight plan is the flight plan over which the FMS is able to guide the aircraft when it is coupled to the automatic pilot. The effective closed-loop control of the aircraft over the active flight plan is obtained by coupling with the automatic pilot. The automatic guidance mode of the aircraft over the active flight plan is also known by the expression "managed guidance mode".

Situations exist in which the aircraft is not closed-loop controlled over the active flight plan. For example, the air traffic controller situated on the ground may have cause to request the aircraft to leave its flight plan, for example in order to ensure the correct separation of the aircraft. In the example illustrated in FIG. 3, the aircraft 101 is in a descent phase or downstream of the T/D, and it has left its pre-calculated descent profile Prof for any given reason (ATC setpoint, effects of the wind, etc.).

When the aircraft leaves its flight plan, the pilot switches into a mode referred to as "selected guidance mode", corresponding to a manual vertical piloting mode, again via the automatic pilot PA.

In this case, the FMS calculates predictions by considering that the aircraft always immediately rejoins the lateral and vertical trajectory, according to a predetermined hypothesis.

Typically, if the aircraft is not on its lateral trajectory (i.e. it is shifted with respect to this trajectory), a lateral trajectory for immediately rejoining it is calculated, according to pre-established hypotheses. For example, an FMS may take as hypothesis an orthodromic line between the aircraft and the "TO waypoint", another may take as hypothesis a path for rejoining the leg formed by the "FROM—TO" with an interception at 45°, or at 90°, to this leg or the shortest distance that gets back to the TO, while at the same time incorporating the turn to be made, or else rejoining by the shortest route to the flight plan (rejoining the flight plan is not then necessarily carried out at the TO waypoint.

Also typically, if the aircraft is not on its vertical trajectory (i.e. it is above or below), an immediate rejoining path is calculated also according to pre-established hypotheses.

For example, for the descent phase, and for an aircraft under its vertical trajectory, an FMS may predict that the aircraft will remain at one flight level (i.e. at a constant altitude) until it intercepts the vertical trajectory in question. Another FMS may have a hypothesis for descending at a low angle or at a low vertical speed in order to also intercept the trajectory.

Again for the descent phase, and for an aircraft above its vertical trajectory, an FMS may predict that the aircraft will dive by adopting a predetermined altitude, greater than the current altitude. Another may predict rejoining with a given aerodynamic slope, steeper than the current slope, following this until it intercepts the vertical trajectory.

The drawback of this situation is that the pre-established hypotheses of the FMS for vertical rejoining only rarely correspond to the manual vertical guidance mode. The integration of the equations according to the pre-established mode therefore gives erroneous results with respect to the reality.

The manual vertical guidance mode is characterized by an altitude setpoint or target altitude, denoted "Altitude clearance", chosen by the pilot, towards which the aircraft is directed. In order to reach it, several piloting modes exist:
constant vertical speed managed, denoted VS for "Vertical Speed",
constant angle managed denoted FPA for "Flight Path Angle",
constant altitude managed, denoted ALT for Altitude,
thrust managed, denoted "Thrust" or "OPEN".

In reality, the crew only fly for a certain time with the current manual vertical mode because, at a given moment, this current mode will be modified in order to follow the flight plan (and its altitude constraints). The return to a guidance mode closed-loop controlled to the flight plan is commonly called "de-selection".

In the situations for which the pilot has come out of the closed-loop controlled ("managed") guidance mode and the aircraft is in manual guidance ("selected") mode and hence no longer follows its flight plan, this poses several problems:

First of all, the aircraft is still obliged to comply with a certain number of altitude constraints associated with its flight plan remaining to be flown (this is referred to as the flight plan "in front of" the aircraft).

These altitude constraints are each characterized by an altitude AO to be complied with associated with a time, expressed by a curvilinear abscissa x.

The constraint may be of the type:
"at": the aircraft must reach the altitude AO for a given x0, symbolized by two top-to-tail triangles,
"at or above": the aircraft must go above the altitude AO for a given x0, symbolized by a head-up triangle,
"at or below": the aircraft must go below the altitude AO for a given x0, symbolized by a head-down triangle.
"Window": the aircraft must go between 2 altitudes at the given point.
This type of constraint corresponds to a "at or above" and a "at or below" at the same point The pilot flying in "selected" mode is in a state of uncertainty with respect to the compliance with these constraints. Indeed, the predictions performed by the FMS become erroneous, because they do not take into account the change of guidance mode and do not correspond to how the aircraft is effectively flying, as explained hereinabove.

One aim of the invention is to overcome the aforementioned drawbacks with the idea of determining a switch-over vertical point from which the pilot can go from manual mode to the mode guided by the FMS while complying with the constraints that are imposed on him/her.

SUMMARY OF THE INVENTION

The subject of the present invention, according to a first aspect, is a method for determining a switch-over vertical point from which an aircraft, having a current position, and flying a current vertical trajectory according to a manual piloting mode having an altitude setpoint, denoted target altitude, loaded by the pilot, switches over to a piloting mode guided by a flight management system, in order to rejoin a predefined flight plan having a set of initial altitude constraints, the method comprising the steps consisting in:

calculating a first predicted vertical trajectory by integration of the dynamic flight equations starting from the current position of the aircraft, by extrapolating the current trajectory and by applying calculation hypotheses corresponding to the manual piloting mode of the aircraft, determining a first point of intersection between the first predicted trajectory and the target altitude, having a first abscissa, the altitude constraints with an abscissa less than the said first abscissa being denoted anterior constraints, the altitude constraints with an abscissa greater than the said first abscissa being denoted posterior constraints, determining a second predicted trajectory by forward integration of the dynamic flight equations starting from the said first intersection point and by applying calculation hypotheses for a piloting mode guided by FMS, determining a sub-set of altitude constraints to be complied with indexed by an index i, the index 1 corresponding to the constraint closest to the current position of the aircraft, chosen from amongst the set of initial altitude constraints, each altitude constraint to be complied with having an abscissa, determining the anterior constraints incompatible with the first predicted trajectory and the posterior constraints incompatible with the second predicted trajectory, determining the said switch-over vertical point belonging to the first predicted vertical trajectory, based on any incompatible constraints, and as the intersection between the said first predicted vertical trajectory and a predicted vertical trajectory calculated by integration of the dynamic flight equations by applying calculation hypotheses for a piloting mode guided by a flight management system denoted FMS.

According to one embodiment the step for determining the switch-over vertical point comprises the sub-steps consisting in:

when no constraint is incompatible, the switch-over vertical point is equal to the first point of intersection, when at least one altitude constraint is incompatible, determining the said switch-over vertical point as the intersection between the first predicted trajectory and a predicted vertical trajectory calculated by backwards integration of the dynamic flight equations starting from an associated incompatible constraint, applying calculation hypotheses for a piloting mode guided by FMS.

According to one embodiment, the step for determining the switch-over point comprises the sub-steps consisting in:

For each incompatible constraint:
  determining a third associated predicted trajectory by backward integration of the dynamic flight equations starting from the associated incompatible constraint and by applying calculation hypotheses for a piloting mode guided by FMS,
  determining a second associated point of intersection corresponding to the intersection between the first predicted vertical trajectory and the third associated predicted trajectory, determining the switch-over vertical point, equal to the second associated point of intersection closest to the current position of the aircraft.

Advantageously, the manual piloting mode is chosen from amongst the group: constant vertical speed managed; constant angle managed; constant altitude managed; thrust managed;

Advantageously, the method furthermore comprises a step of graphical display of the switch-over vertical point According to one variant, the aircraft is in a climbing phase and the calculation hypotheses for the piloting mode guided by FMS incorporate an operational criterion of the thrust managed type or of the altitude hold type.

According to another variant, the aircraft is in a descent phase and must rejoin a predetermined altitude profile and the calculation hypotheses for the piloting mode guided by FMS incorporate an operational criterion being a function of the position of the aircraft with respect to the predetermined altitude profile.

According to one embodiment, the aircraft is situated below the predetermined altitude profile, and the operational criterion is of type constant vertical speed managed or of type altitude hold.

According to another embodiment, the aircraft is situated above the predetermined altitude profile and the operational criterion is of the thrust managed type, the criterion being settable by a positioning of the airbrakes chosen from amongst the group: no airbrakes; airbrakes half out; airbrakes completely deployed.

According to one variant, the method according to the invention furthermore comprises a step consisting in calculating a predicted global trajectory based on the concatenation of at least two portions:

a first portion equal to the first predicted trajectory, up to the switch-over vertical point and a second portion, starting from the switch-over vertical point, equal to:
  the second predicted trajectory when no altitude constraint is incompatible,
  the third predicted trajectory associated with the switch-over vertical point when at least one altitude constraint is incompatible.

According to one variant, the method according to the invention furthermore comprises the steps consisting in:

selecting a chosen point belonging to the first predicted trajectory, replacing the switch-over vertical point by the chosen point, calculating a predicted global trajectory based on the concatenation of at least two portions:

a first portion equal to the first predicted trajectory, up to the chosen point, a second portion, starting from the chosen point, corresponding to a trajectory calculated by forward integration of the dynamic flight equations according to a piloting mode guided by an FMS.

Advantageously, the step for selection of the chosen point is carried out by a pilot.

According to one embodiment, the aircraft is in a descent phase and must rejoin a predetermined altitude profile, and the method according to the invention furthermore comprises the steps consisting in:
  determining a third point equal to the intersection between the first predicted trajectory and the said predetermined altitude profile,
  when the said third point is reached before the calculated switch-over vertical point:
    calculating a predicted global trajectory based on the concatenation of at least two portions:
    a first portion equal to the first predicted trajectory, up to the third point,
    a second portion, starting from the third point, corresponding to a trajectory calculated by integration of the dynamic flight equations according to a piloting mode guided by a FMS following the predetermined altitude profile.

According to one embodiment, the method according to the invention furthermore comprises a step consisting in calculating predictions of state parameters of the aircraft based on a predicted global trajectory.

Advantageously, the state parameters of the aircraft comprise the predicted altitude of passage, the predicted speed of passage, the predicted remaining fuel.

According to another aspect, the invention relates to a device for calculating predictions and a flight management system for an aircraft of the FMS type comprising the device according to the invention.

Finally, according to a last aspect, the invention relates to a computer programme product, the computer programme comprising code instructions allowing the steps of the method according to the invention to be carried out.

Other features, aims and advantages of the present invention will become apparent upon reading the detailed description that follow and with regard to the appended drawings presented by way of non-limiting examples and in which:

FIG. 1, already mentioned, shows the various components of an FMS.

FIG. 2, already mentioned, illustrates one example of a vertical trajectory.

FIG. 3, already mentioned, illustrates a situation in which an aircraft in a descent phase has left its flight plan.

DETAILED DESCRIPTION

Figure 1:
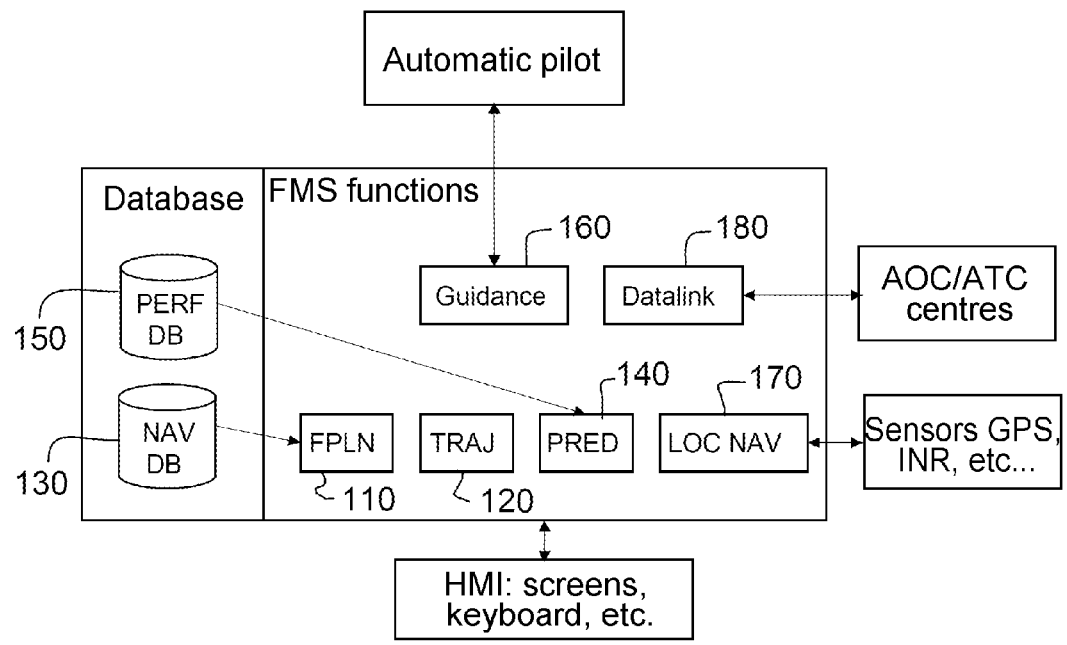
Figure 2:
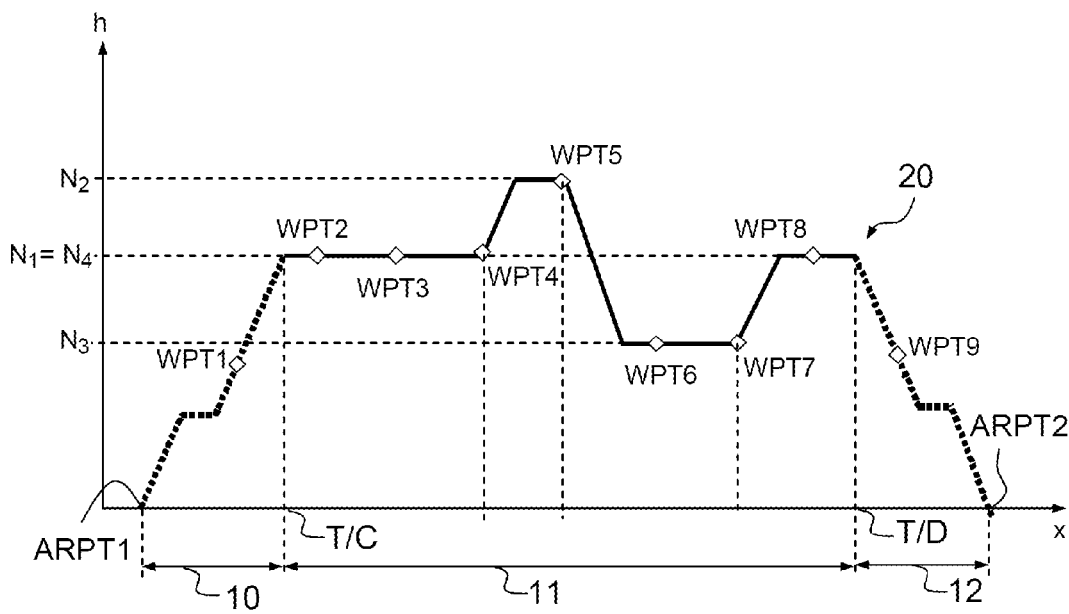
Figure 3:
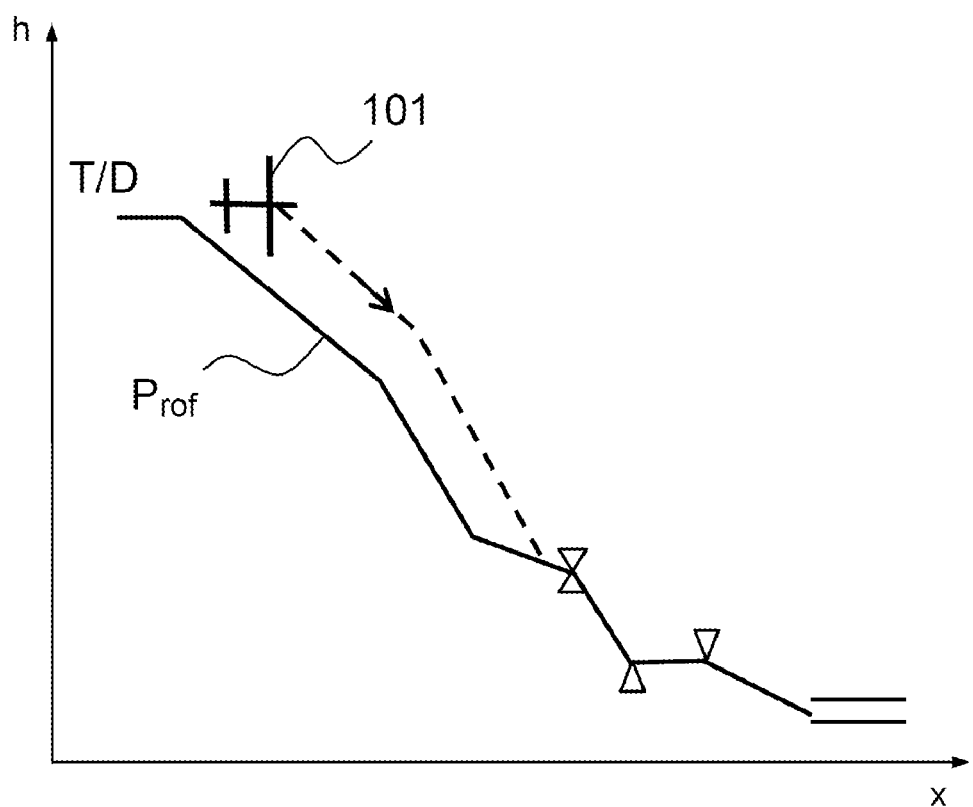
Figure 4:
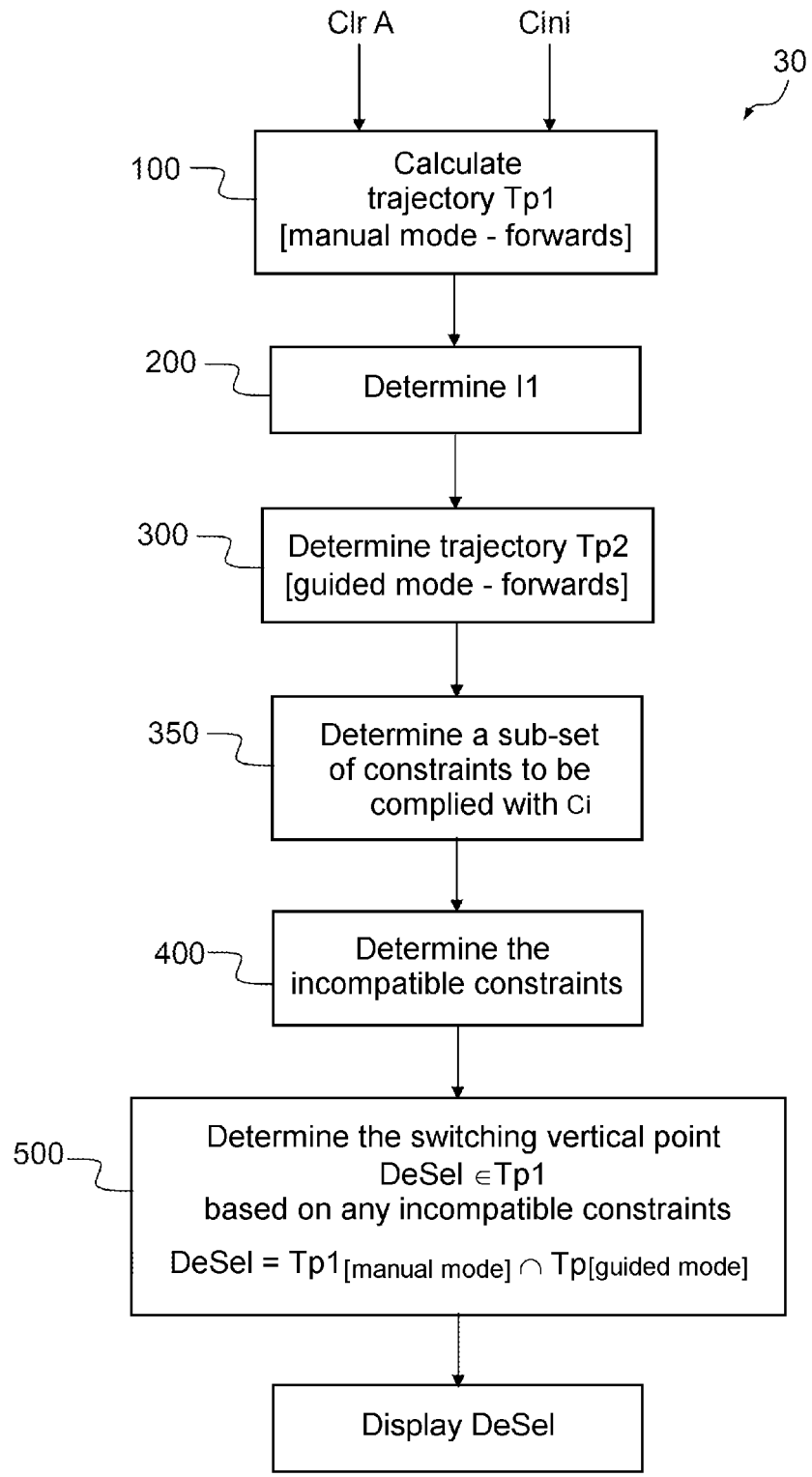
FIG. 4 illustrates the method according to the invention.

The method for determining a switch-over vertical point DeSel from which an aircraft 101 switches to a piloting mode guided by a flight management system FMS in order to rejoin a predefined flight plan PV having a set Cini of initial altitude constraints is illustrated in FIG. 4. The aircraft 101 has a current position Pcurr and is flying a current vertical trajectory according to a manual piloting mode described hereinbelow, having an altitude setpoint ClrA denoted target altitude and loaded by the pilot.

The method according to the invention comprises the following steps:

A first step 100 calculates a first predicted vertical trajectory Tp1 by integration of the dynamic flight equations starting from the current position of the aircraft, by extrapolating the current trajectory and by applying calculation hypotheses corresponding to the manual piloting mode of the aircraft. The trajectory Tp1 is illustrated with a bold dashed line in FIG. 5 for an aircraft 101 in a climb and in FIG. 6 for an aircraft in a descent. By way of example, in FIG. 5, the manual mode is of the FPA type, closed-loop controlled to an angle of 3° and, in FIG. 6, the manual mode is of the VS type closed-loop controlled to a speed of descent of 600 feet per minute.

Preferably, the calculation hypotheses for the manual piloting mode correspond to the modes currently implemented in the FMS according to the prior art. The mode is chosen within the group: constant vertical speed managed VS; constant angle managed FPA; constant altitude managed ALT; thrust managed THRUST.

Figure 5:
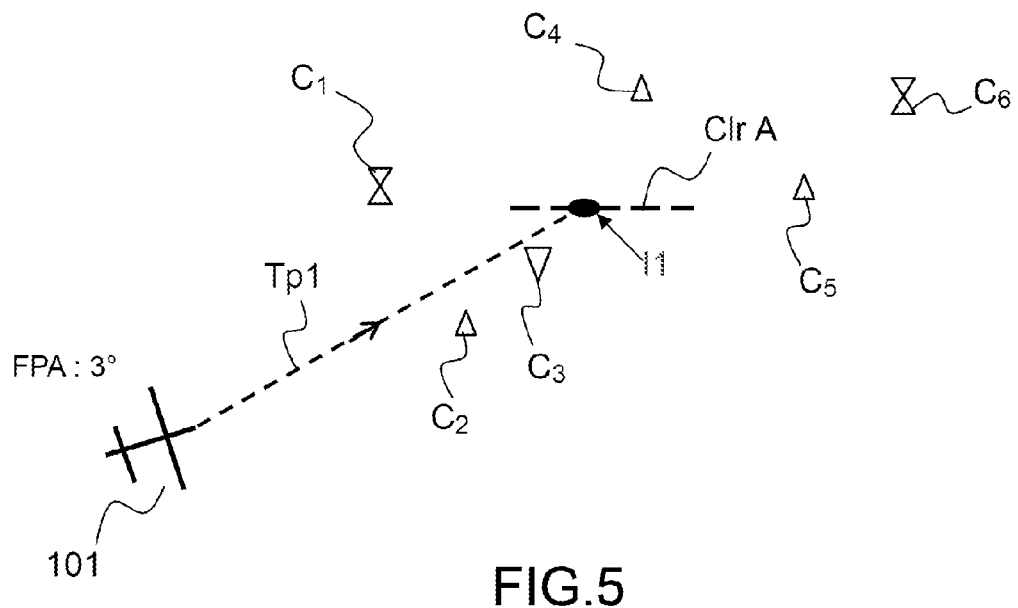
FIG. 5 illustrates the predicted trajectory in a manual mode for an aircraft guided in manual piloting mode and subjected to altitude constraints in a climbing phase.
Figure 6:
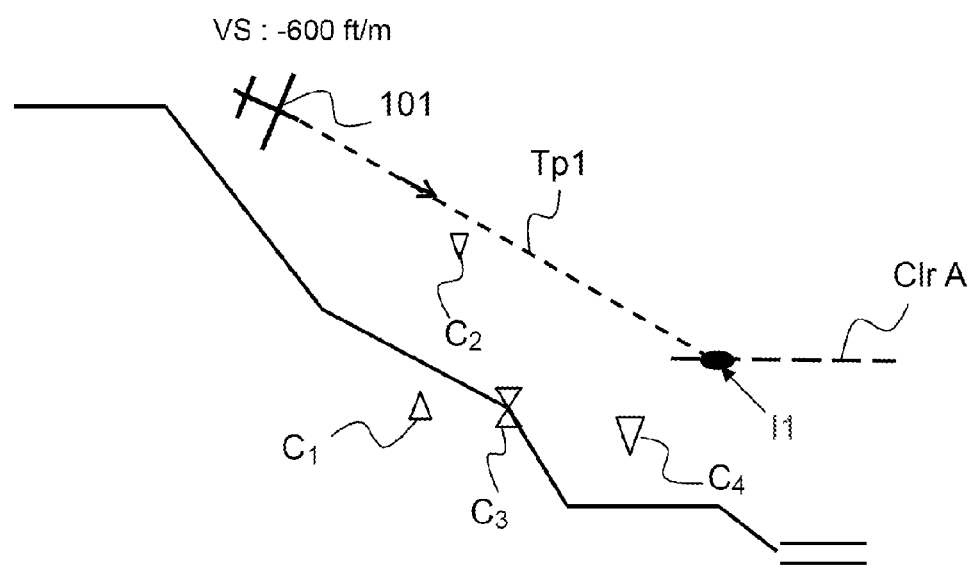
FIG. 6 illustrates the predicted trajectory in manual mode for an aircraft in manual piloting mode and subjected to altitude constraints in a descent phase.

A second step 200 consists in determining a first point of intersection 11 between the first predicted trajectory Tp1 and the target altitude ClrA, also illustrated in FIGS. 5 and 6. I1 has a first curvilinear abscissa x1. The curvilinear abscissa x1 divides the space of the abscissae into two zones: a first region of abscissae included between the current abscissa of the aircraft $x_{curr}$ and x1 and a second region of abcissaes greater than x up to the arrival. The altitude constraints with an abscissa x lower than the first abscissa being denoted anterior constraints, the altitude constraints of abscissa x higher than the first abscissa being denoted posterior constraints:

$x_{curr} < x \leq x1$ anterior constraint $x > x1$ posterior constraint

A third step 300 determines a second predicted trajectory Tp2 by forward integration of the dynamic flight equations starting from the first intersection point 11 and by applying calculation hypotheses for a piloting mode guided by FMS ("managed" mode). Tp2 is calculated according to the prior art by taking into account all of the initial constraints, and predefined hypotheses, for example an option ½ AB (for half Air Brakes) for the descent phase, meaning with the airbrakes halfway out.

Figure 7:
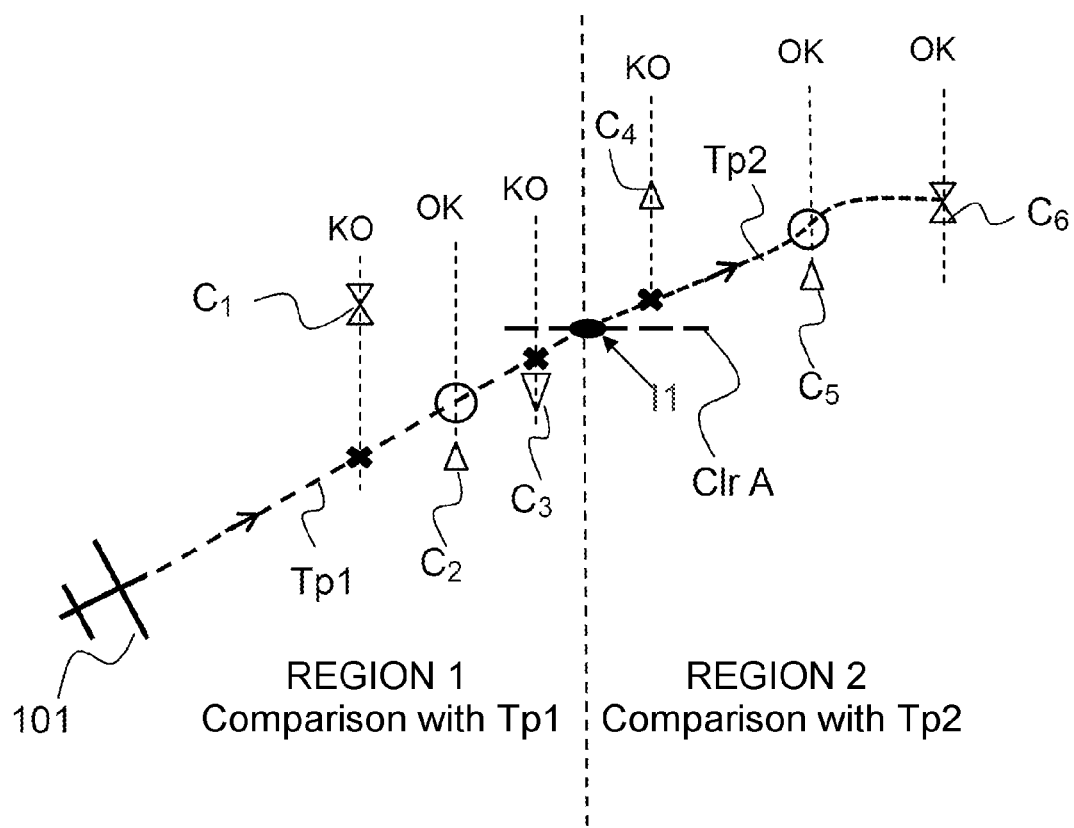
FIG. 7 illustrates the determination of the incompatible constraints, based on the predicted trajectories Tp1 and Tp2, for an aircraft in a climbing phase.
Figure 8:
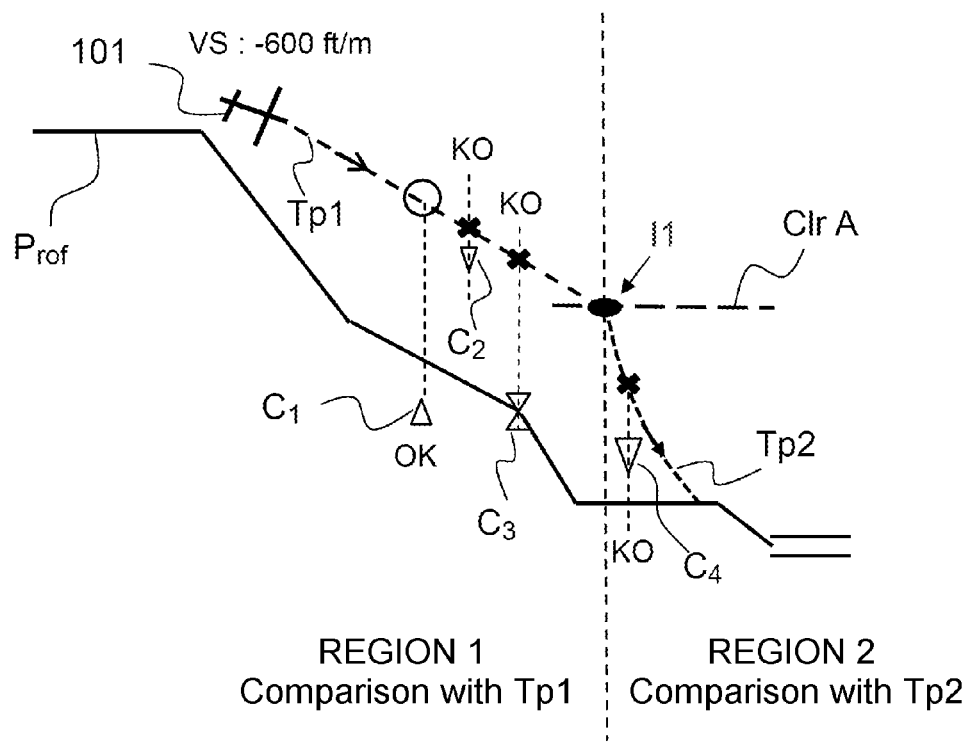
FIG. 8 illustrates the determination of the incompatible constraints, based on the predicted trajectories Tp1 and Tp2, for an aircraft in a descent phase and situated above the predetermined descent profile.
Figure 9:
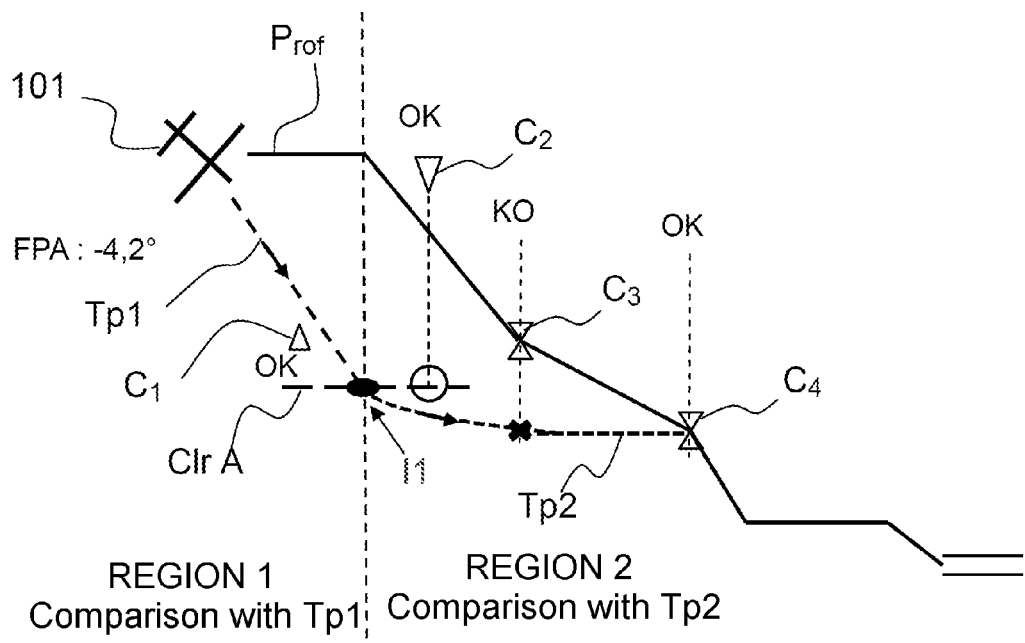
FIG. 9 illustrates the determination of the incompatible constraints, based on the predicted trajectories Tp1 and Tp2, for an aircraft in a descent phase and situated below the predetermined descent profile.

The calculated trajectory Tp2 is illustrated in FIG. 7 for an aircraft 101 in a climb and in FIGS. 8 and 9 for an aircraft in a descent, using thin dotted lines. FIG. 8 illustrates an aircraft 101 flying above the precalculated descent profile Prof described in the prior art, FIG. 9 an aircraft 101 flying below Prof. The orientation by an arrow of the trajectories Tp1 and Tp2 illustrates the fact that these trajectories are calculated in "forward" mode.

A step 350 determines a sub-set of altitude constraints to be compled with Ci indexed by an index i, the index 1 corresponding to the constraint closest to the current position of the aircraft and the index i increasing in a direction moving away from the aircraft. The constraints C1, C2 . . . Cn are chosen from amongst the set Cini of initial altitude constraints, each altitude constraint to be comples with having an abscissa xi:

$$(C1, x1), (C2, x2) \qquad (Cn, xn).$$

This step 350 carried be carried out after departure, the choice of the constraints to be complied with Ci being independent of the calculation of Tp1 and I1.

The constraints to be complied with C1 to C6 for the example of the climb phase are illustrated in FIGS. 5 and 7, the constraints to be complied with C1 to C4 for the example of the descent phase are illustrated in FIGS. 6 and 8 for a descent above Prof, and FIG. 9 for a descent below Prof.

The sub-set of the constraints to be complied with may be determined according to several variants or according to various criteria.

By way of example, according to a first variant, the sub-set of constraints to be complied with Ci is equal to all of the initial constraints Cini of the flight plan situated downstream of the current position Pcurr of the aircraft.

According to a second variant, the set of constraints to be complied with is empty.

According to a third variant the sub-set comprises only the constraints beyond of a given initial constraint, for example in a descent phase all the constraints starting from the approach flight level. According to a fourth variant, in a descent phase, the sub-set only comprises the constraint of the final approach denoted FAF. These different variants are illustrated further on in FIG. 15.

According to one embodiment, the sub-set is determined by the pilot.

For example, when a pilot is cleared for descent towards the airport by air traffic control at a low altitude, according to an imposed descent mode, he/she may decide to ignore the intermediate constraints and rejoin the altitude of the FAF directly, if the altitude constraints do not correspond to safety altitudes with respect to high terrain or other lower open airspaces. In the case of a descent over more mountainous terrains for example, the pilot may decide to comply with all the altitude constraints.

According to one embodiment, when the pilot wishes to add a constraint in the sub-set, he/she inserts in a first step the constraint to be added into the flight plan, which thus then enters into the set of initial constraints Cini, the, in a second step, the pilot choses this constraint to belong to the sub-set.

According to another embodiment the sub-set is determined by external equipment.

According to one example, the sub-set of the constraints to be imperatively complied with is supplied via digital datalink (DATALINK) via onboard communications equipment. According to another example, the constraints to be complied with may also be imposed by an onboard terrain or weather monitoring system, requesting to fly above an altitude of danger.

In a step 400, the system determines the incompatible constraints.

For the anterior constraints in the region 1, the incompatibility is determined with respect to the first predicted trajectory Tp1. For the posterior constraints of the region 2, the incompatibility is determined with respect to the second predicted trajectory Tp2.

The compatibility of a constraint Ck is made by projection of the curvilinear abscissa xk of this constraint onto the predicted trajectory in question. The combination of the value of this projection and of the type of constraint (At, At or Above, At or Below, Window) allows the compatibility or otherwise of the constraint to be deduced.

Examples of compatible and incompatible constraints are given in FIGS. 7 to 9.

For example, in FIG. 7, the constraint C1 "At" and the constraint C3 "At or Below" are not compatible for the aircraft flying Tp1. Similarly, the constraint C4 "at or above" is not compatible for the aircraft flying according to Tp2.

In FIG. 8, the constraint C2 "At or Below" and the constraint C3 "At" are not compatible for the aircraft flying Tp1. Similarly, the constraint C4 "At or Below" is not compatible for the aircraft flying according to Tp2.

A final step 500 determines the switch-over vertical point DeSel belonging to the first predicted vertical trajectory Tp1 (predicted trajectory of the manual type), based on any incompatible constraints when the step 350 has identified any, as the intersection between Tp1 and a predicted vertical trajectory calculated by integration of the dynamic flight equations by applying calculation hypotheses for a piloting mode guided by a flight management system denoted FMS, being a predicted vertical trajectory said to be "of the guided type".

The identification of the incompatible constraints allows the method according to the invention to calculate a predicted vertical trajectory of the guided type adapted to the constraints of the flight. The switch-over vertical point DeSel is positioned, in altitude and in curvilinear abscissa, at the point of intersection between the first predicted trajectory Tp1 and the predicted vertical trajectory of the guided type.

The determination of this point DeSel allows, on the one hand, the system to calculate an optimized global trajectory that can serve as a basis for more coherent predictions (see further on) and, on the other hand, gives valuable information to the pilot on the compliance or not with the constraints and on the moment when he/she will be able to switch to "guided" mode.

In addition, the knowledge of the DeSel constitutes a valuable piece of information for the pilot, for communicating with air traffic control and negotiating his/her vertical trajectory.

According to one preferred embodiment, the method 30 according to the invention furthermore comprises a step 600 for graphical display of the switch-over vertical point. The pilot thus disposes in a visual, immediately accessible, manner of the information on the localization, in altitude and in curvilinear abscissa, of the switch-over point DeSel.

Figure 10:
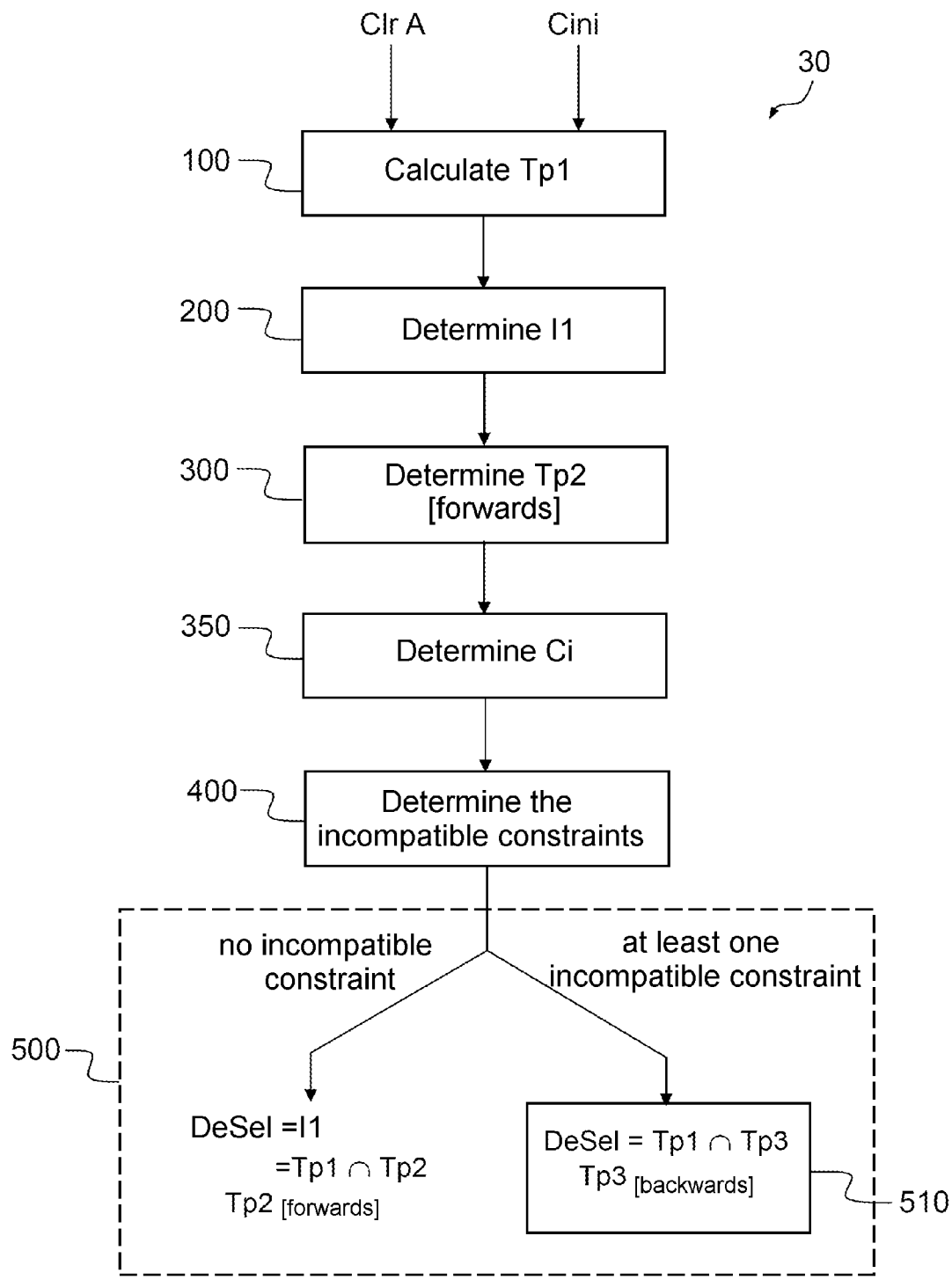
FIG. 10 illustrates one embodiment of the method according to the invention.

According to one embodiment illustrated in FIG. 10, the step 500 for determining the switch-over vertical point DeSel has two options, depending on whether at least one incompatible constraint has been identified at 400 or not.

When no constraint is incompatible, the switch-over vertical point DeSel is equal to the first point of intersection I1. By construction of Tp2, the point DeSel is equal to the intersection between Tp1 (manual mode and forwards) and Tp2 (guided mode and forwards):

$$DeSel = I1 = Tp1_{[manual\ mode-forwards]} \cap Tp2_{[mode\ guided-forwards]}.$$

Tp1: manual mode-forwards
Tp2: mode guided-forwards starting from I1.
This case is also applicable when the sub-set of constraints to be complied with is empty.

When at least one altitude constraint is incompatible, the method comprises a sub-step 510 for determining the switch-over vertical point DeSel, as the intersection between the first predicted vertical trajectory Tp1 and a predicted vertical trajectory Tp3 calculated by backwards integration of the dynamic flight equations starting from an associated incompatible constraint, by applying calculation hypotheses for a piloting mode guided by FMS.

$$DeSel = Tp1 \cap Tp3_{[mode\ guided-backwards]}$$

Tp1: manual mode-forwards
Tp3: mode guided-backwards from an incompatible constraint.

Figure 11:
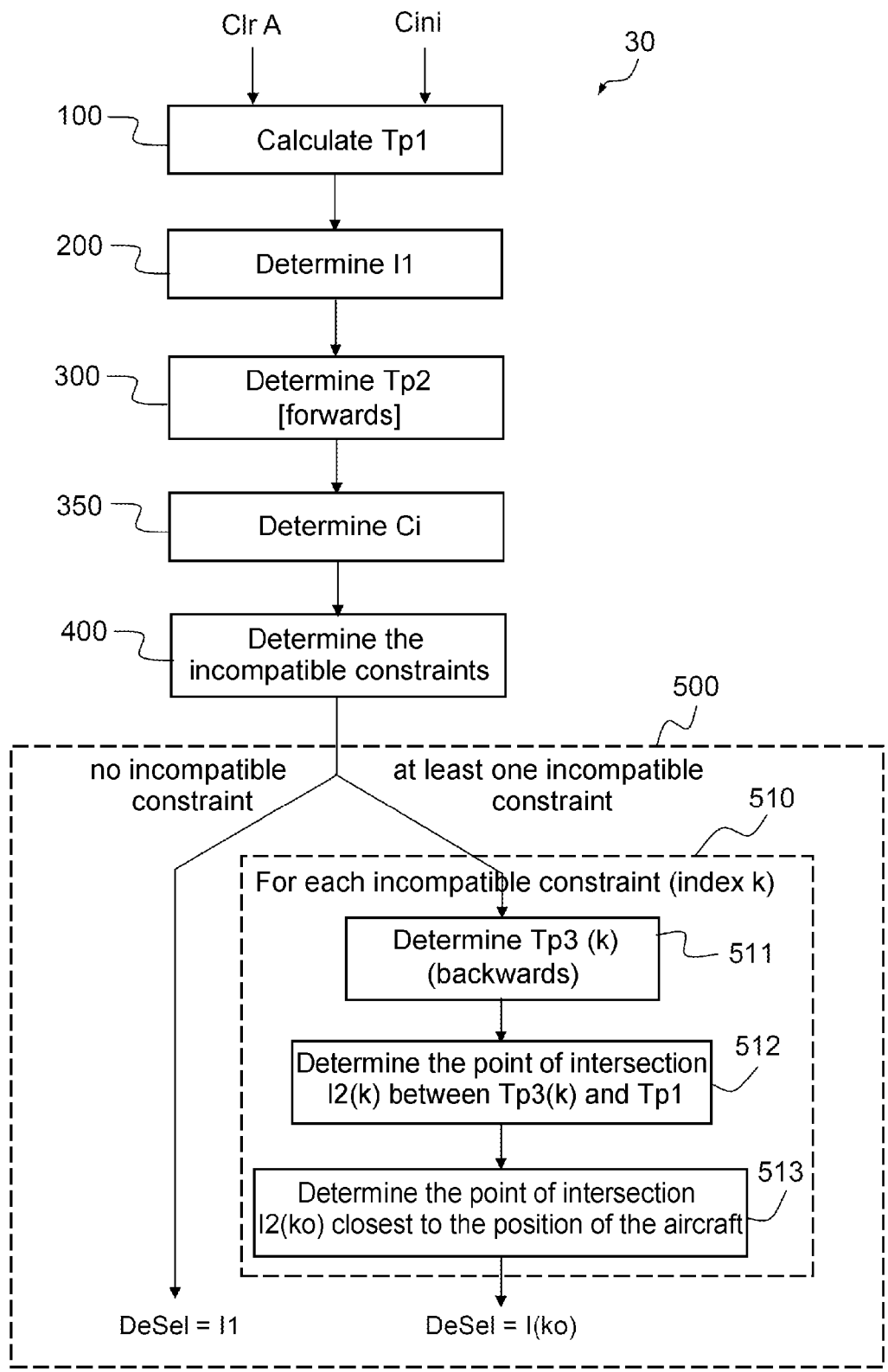
FIG. 11 illustrates one preferred embodiment of the method according to the invention.

According to one preferred embodiment illustrated in FIG. 11, the sub-step 510 is refined by taking into consideration the distribution over time of the incompatible constraints. The sub-step 510 comprises the sub-steps consisting in:

First of all, for each incompatible constraint Ck indexed k, the sub-step 511 determine a third predicted trajectory associated Tp3(k) by backwards integration of the dynamic flight equations starting from the incompatible constraint Ck associated and applying calculation hypotheses for a piloting mode guided by FMS.

It is considered here that the index k corresponds to the index of the incompatible constraints detected at the step 400: k is a sub-set of i.

For example, in the example in FIG. 7, the incompatible constraints are: C1, C3, (anterior constraints) C4 (posterior constraint, and k=1,3,4. In the example in FIG. 8, the incompatible constraints are: C2, C3 (anterior constraints) C4 (posterior constraint), and k=2, 3, 4, and in the example in FIG. 9, the incompatible constraints are: C3, (posterior constraint) and k=3.

Subsequently, a sub-step 512 determines, for each k, a second associated point of intersection I2(k) corresponding to the intersection between the first predicted vertical trajectory Tp1 and the third associated predicted trajectory Tp3 (k).

Lastly, a step 513 determines the switch-over vertical point DeSel, which is equal to the second associated point of intersection I2($k_0$) closest to the current position of the aircraft, with index $k_0$.

Figure 13:
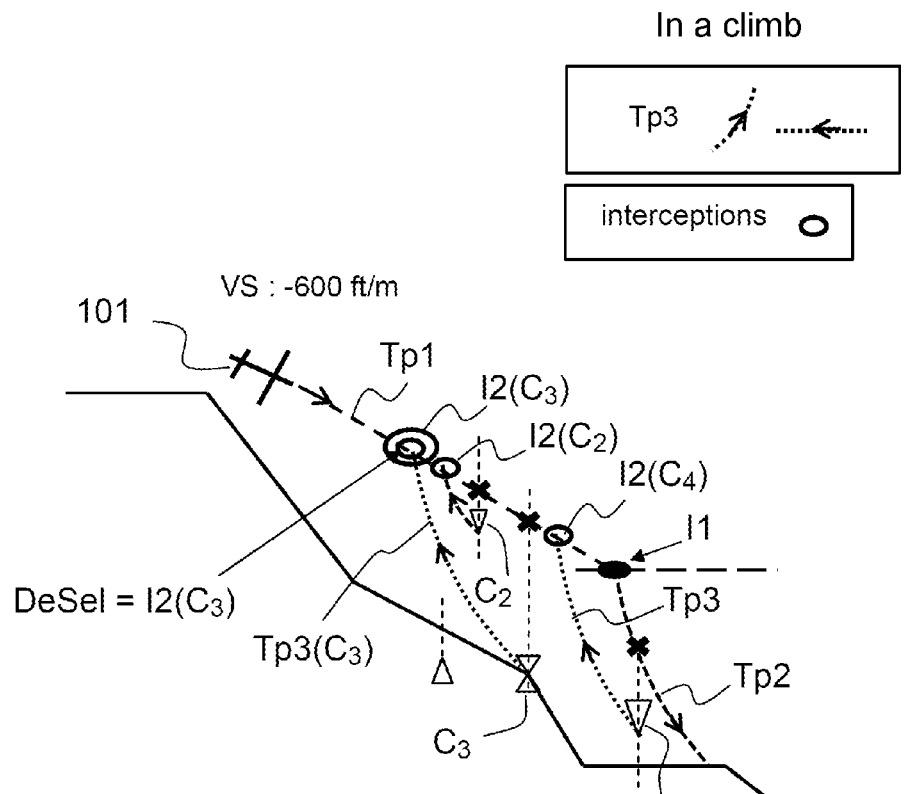
FIG. 13 illustrates the mode of calculation of the switch-over vertical point based on trajectories Tp3 calculated backwards for an aircraft in a descent phase and situated above the predetermined descent profile.

The index $k_0$ is not necessarily the lowest index, as illustrated in FIG. 13, in which I2($C_3$) is closer to the current position of the aircraft 101 than I2($C_2$).

The calculation of the DeSel according to the preferred embodiment is illustrated in FIGS. 12, 13 and 14, taking again the examples in FIGS. 7, 8 and 9.

Figure 12:
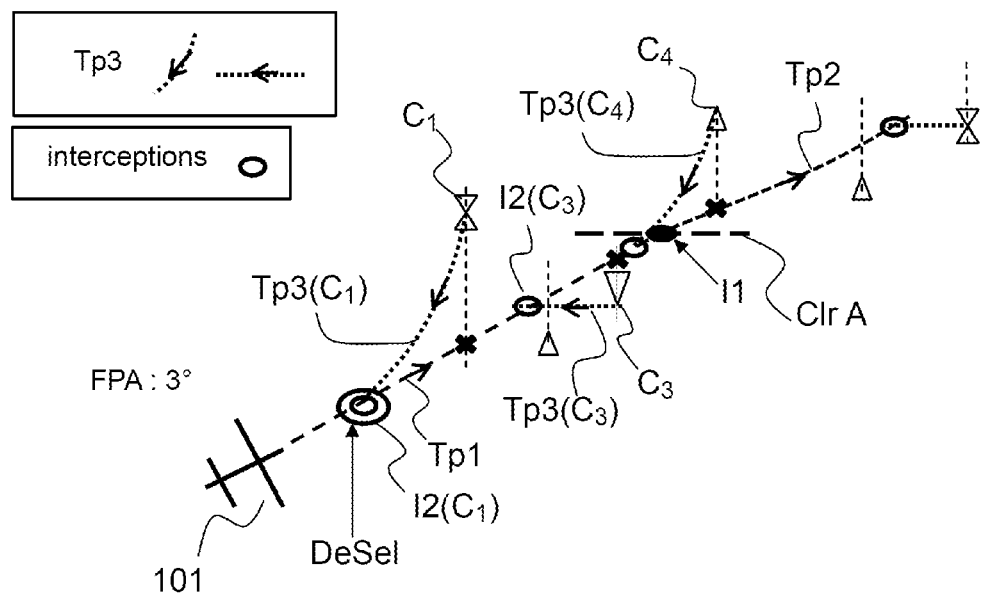
FIG. 12 illustrates the mode of calculation of the switch-over vertical point based on trajectories Tp3 calculated backwards for an aircraft in a climbing phase.

In FIG. 12, "backward" trajectories Tp3 are calculated for the incompatible constraints C1, C3 and C4.

In FIG. 13, "backward" trajectories Tp3 are calculated for the incompatible constraints C2, C3 and C4. It can be seen in FIG. 13 that the point I2 corresponding to the DeSel I2(C3), $k_0$=3, does not necessarily correspond to the incompatible altitude constraint closest to the current position of the aircraft (C2, k=2).

Figure 14:
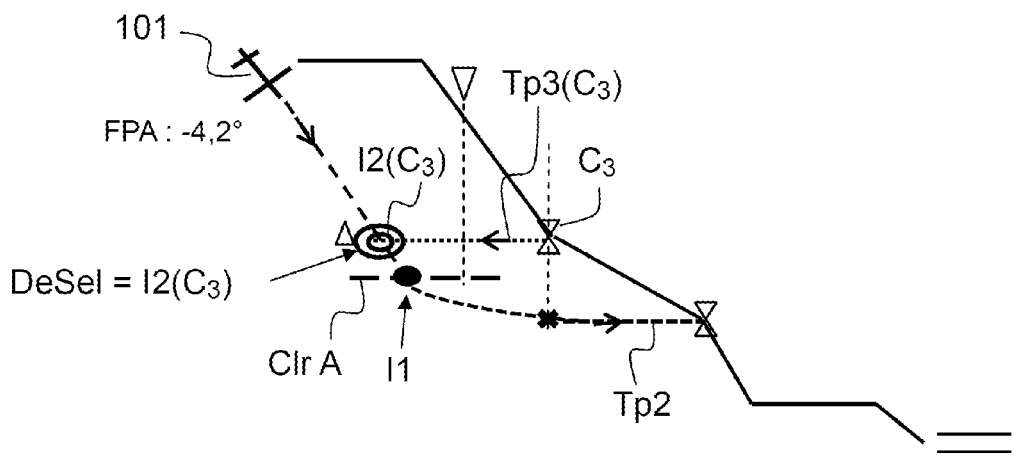
FIG. 14 illustrates the mode of calculation of the switch-over vertical point based on trajectories Tp3 calculated backwards for an aircraft in a descent phase and situated below the predetermined descent profile.

In FIG. 14, "backward" trajectories Tp3 are calculated for the incompatible constraints C1, C3 and C4.

As previously described, the sub-set of the altitude constraints to be complied with may be chosen according to different variants.

Figure 15:
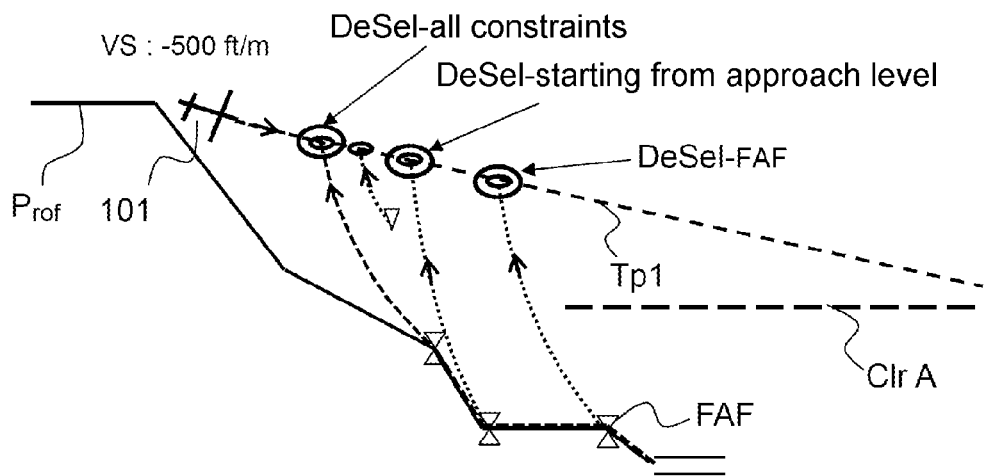
FIG. 15 illustrates des variants of choice of the sub-set of constraints a respecter.

FIG. 15 illustrates these variants in a descent situation and the impact on the determination of the DeSel.

The trajectories Tp3 corresponding to each incompatible constraint are calculated.

The DeSel varies according to the choice/criterion:
all constraints or
constraints starting from the approach flight level or
only the final constraint FAF The "forward" calculation for Tp2 and "backward" calculation for Tp3 have parameters that are adjustable depending on operational criteria.

The operational criteria depend for example on the situation of the aircraft, climbing or descending, and on the situation of the descent.

According to one option, the parameters of Tp2 are fixed in the FMS, whereas the parameter adjustment for Tp3 is possible.

According to another option, the setting of the parameters for the calculations of Tp2 and Tp3 is possible.

According to one embodiment, when the aircraft is in a climbing phase, the calculation hypotheses for the piloting mode guided by FMS incorporate an operational criterion of the thrust managed type, denoted "Thrust Climb managed" or "OPEN Climb", or of the altitude hold type, denoted "ALT", corresponding to one altitude flight level.

According to one embodiment, when the aircraft is in a descent phase and has to rejoin a predetermined altitude profile Prof, the calculation hypotheses for the piloting mode guided by FMS incorporate an operational criterion that is a function of the position of the aircraft with respect to the predetermined altitude profile Prof.

For example for an aircraft situated below the predetermined altitude profile Prof, the operational criterion is of the constant vertical speed managed type, denoted "VS managed", or of the altitude hold type.

Figure 16:
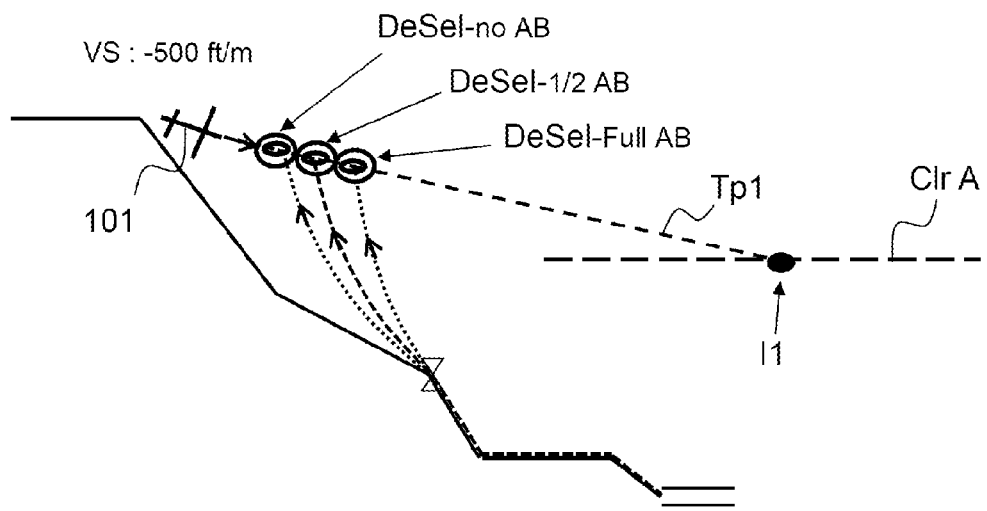
FIG. 16 illustrates various operational criteria for the setting the parameters in the calculation of Tp3.

According to another example illustrated in FIG. 16, for an aircraft situated above the predetermined altitude profile Prof, the operational criterion is of the thrust managed type, denoted "THRUST Idle Managed" or "OPEN DES", this criterion being settable by a positioning of the airbrakes chosen from amongst the group: no airbrakes "no Airbrake"; airbrakes set half out "½ Airbrake"; airbrakes completely deployed "full Airbrake".

Figure 17:
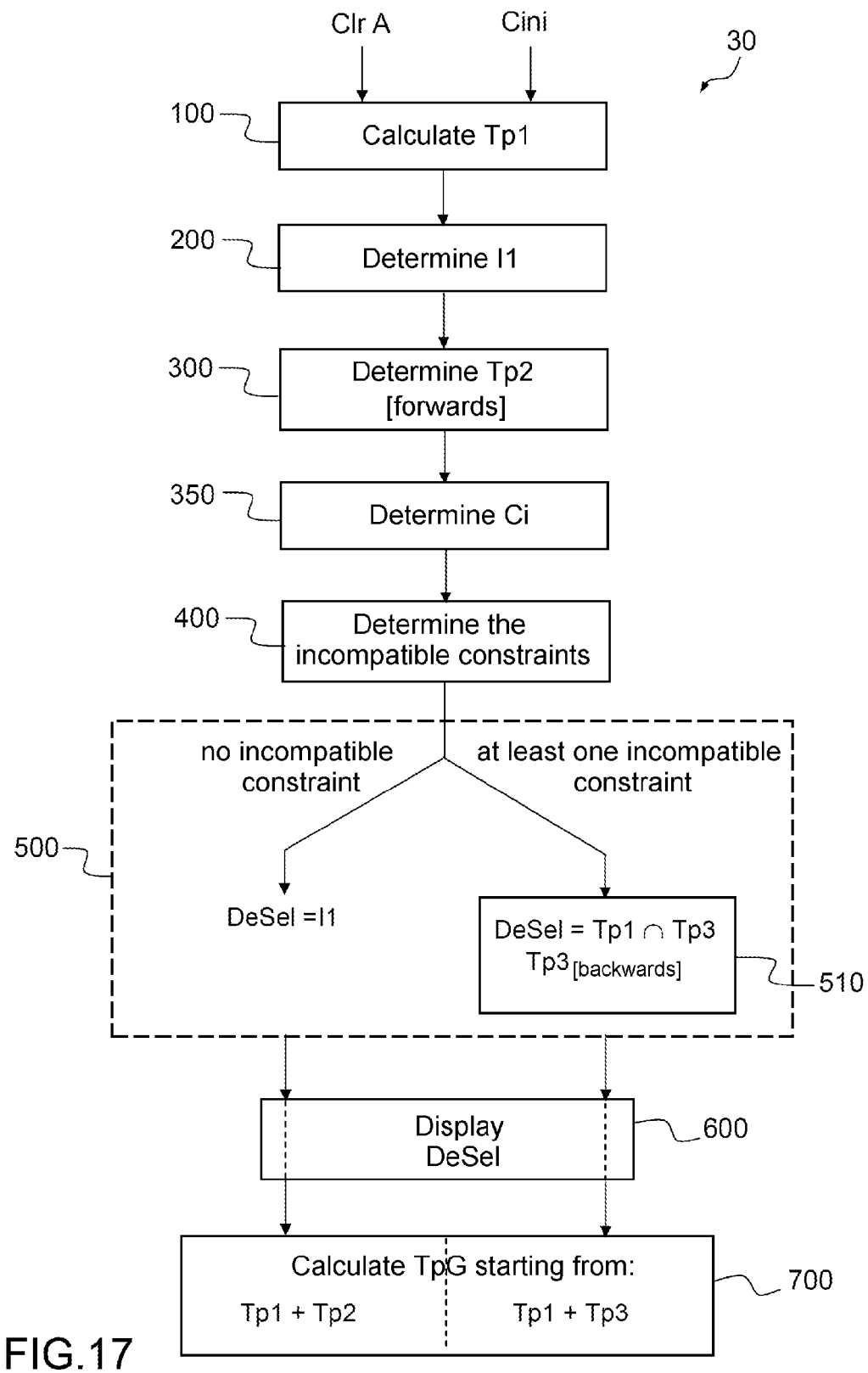
FIG. 17 illustrates another embodiment of the method according to the invention.

According to one preferred embodiment illustrated in FIG. 17, once the DeSel has been determined, the method according to the invention uses this DeSel for calculating a predicted global trajectory of the aircraft.

Thus, the method furthermore comprises a step 700 consisting in calculating a predicted global trajectory TpG based on the concatenation of at least two portions:

a first portion equal to the first predicted trajectory Tp1 up to the switch-over vertical point DeSel and a second portion starting from the switch-over vertical point DeSel. The second portion is equal to the second predicted trajectory Tp2 when no constraint is incompatible and to the third associated predicted trajectory Tp3 at the switch-over vertical point when at least one incompatible constraint has been identified at 400.

The predicted global trajectory thus takes into account trajectories of the aircraft that are close to the reality, by taking into account in an exact manner the selected or managed guidance mode of the aircraft as a function of time.

For the crew, there is now only one single trajectory, and no longer two trajectories, Tp1 and Tp2, displayed on screens and calculated based on different hypotheses.

Figure 18:
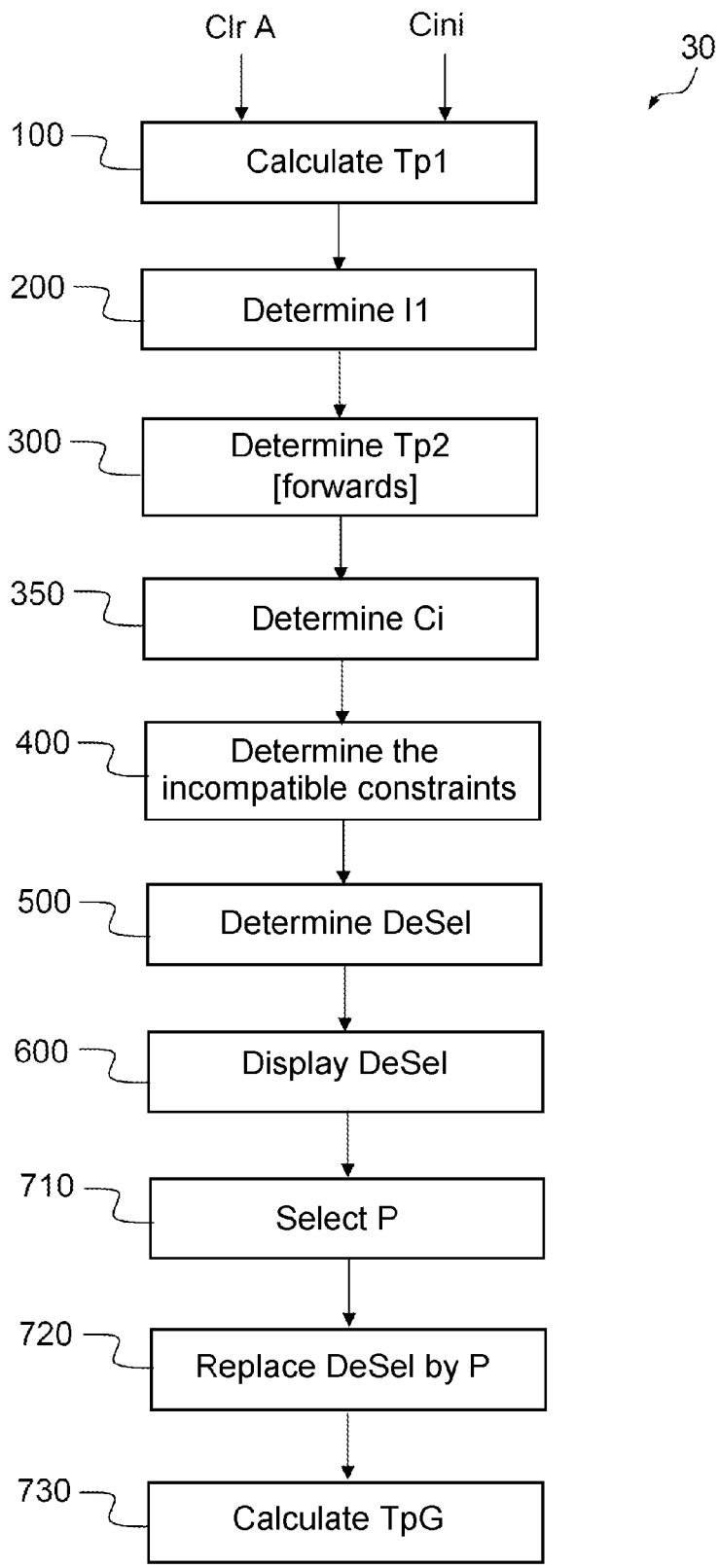
FIG. 18 illustrates one variant of the method according to the invention.

According to one variant illustrated in FIG. 18, the method 30 according to the invention furthermore comprises the following steps:
- a step 710 selects a chosen point P belonging to the first predicted trajectory Tp1, other than the point DeSel determined at the step 500.
- subsequently, a step 720 replaces the switch-over vertical point DeSel by the chosen point P and, according to one variant, graphically displays it.
- then a step 730 calculates a predicted global trajectory TpG based on the concatenation of at least two portions:
- a first portion equal to the first predicted trajectory Tp1, up to the chosen point P,
- a second portion, starting from the chosen point P, corresponding to a trajectory calculated by forward integration of the dynamic flight equations Tp2 according to a piloting mode guided by a FMS.

The predicted global trajectory TpG takes into account the chosen point P rather than the DeSel calculated in 500.

According to one preferred embodiment, the step 710 for selection of the chosen point P is operated by the pilot.

One advantage is that the pilot can adapt the situation to the context of the day (constraint to be ignored since no mountainous terrain or noise impact), constraint to be complied with in order to follow a company policy, etc. The pilot may also adapt the point after having acquired knowledge of the moment when he/she will be "cleared" to rejoin his/her vertical flight plan, via a communication with the controller. Thus, the method provides a point of DeSel according to its hypotheses, but keeps flexibility in order to allow the crew to always be able to adapt to the particular case.

Figure 19:
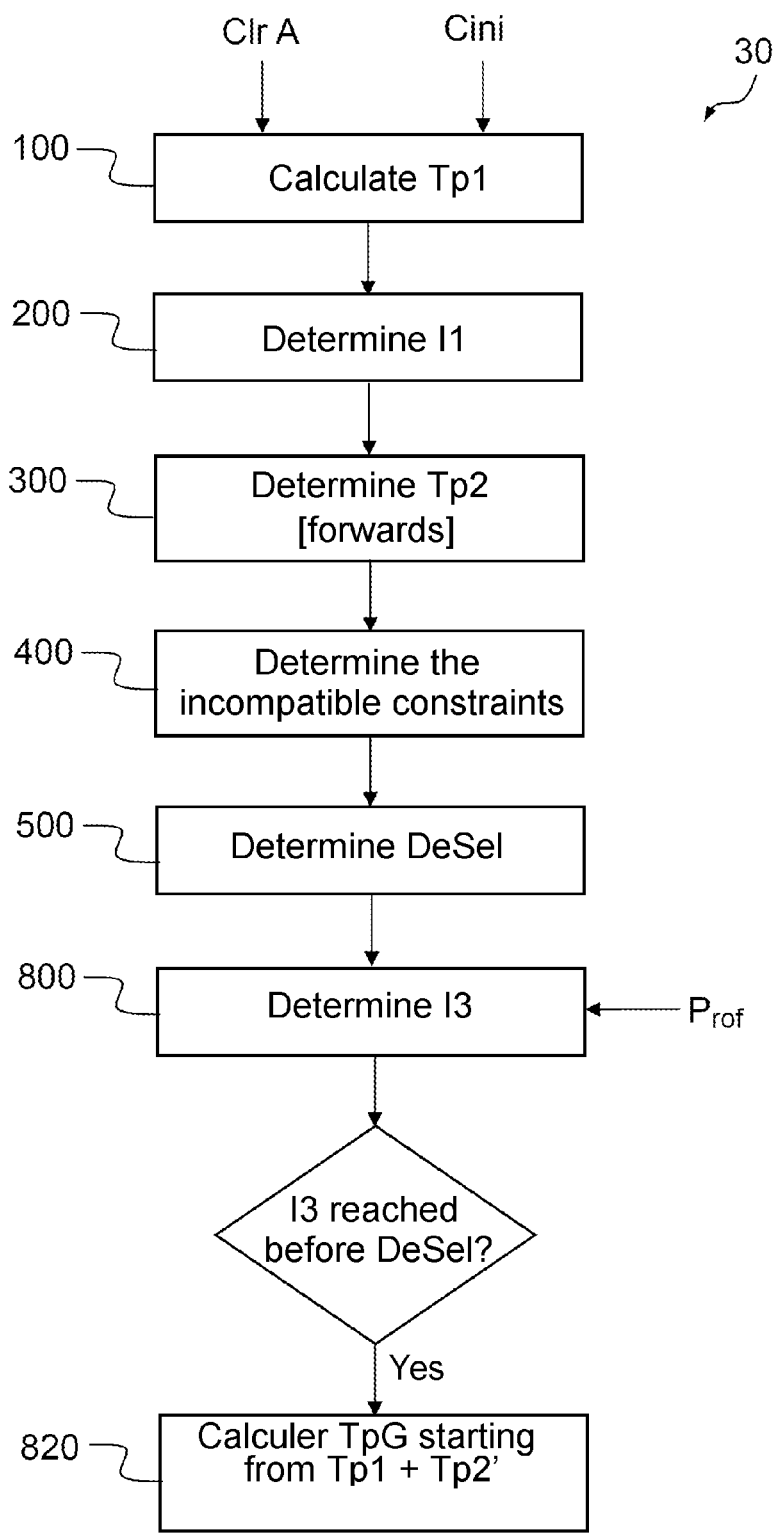
FIG. 19 illustrates another variant of the method according to the invention.

According to another variant illustrated in FIG. 19, the aircraft being in a descent phase and needing to rejoin a predetermined altitude profile Prof, the method 30 furthermore comprises the following steps:
- a step 800 for determining a third point I3 equal to the intersection between the first predicted trajectory Tp1 and the predetermined altitude profile Prof,
- When the third point I3 is reached prior to the calculated switch-over vertical point DeSel, a step 820 calculates a predicted global trajectory TpG based on the concatenation of at least two portions:
- a first portion equal to the first predicted trajectory Tp1, up to the third point I3,
- a second portion Tp2', starting from the third point I3, corresponding to a trajectory calculated by integration of the dynamic flight equations according to a piloting mode guided by a FMS following the predetermined altitude profile Prof.

Figure 20:
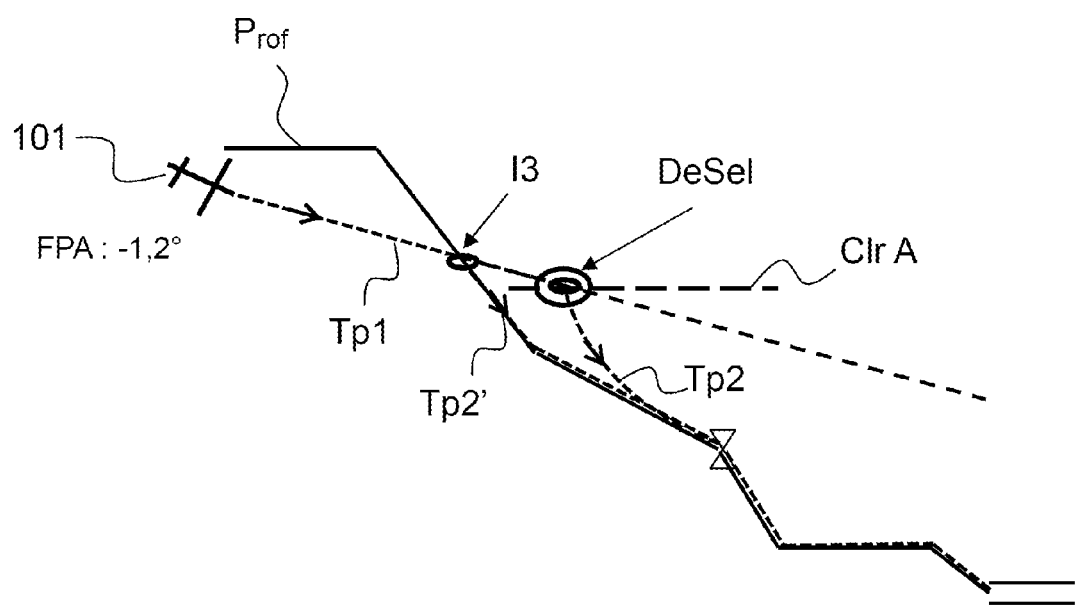
FIG. 20 shows schematically the case in which the trajectory Tp1 cuts the predetermined descent profile before reaching the DeSel.

FIG. 20 shows schematically this case in which the trajectory Tp1 cuts the profile Prof prior to reaching DeSel.

The pilot may then prefer to follow the descent profile Prof according to Tp2' as soon as possible, rather than waiting to rejoin later by following Tp1 then Tp2.

Indeed, the profile Prof being the result of an FMS optimization for minimizing the consumption of fuel, it is advantageous for the pilot to follow it as soon as he/she has intercepted it.

The calculation of a predicted global trajectory TpG remaining to be flown, operated by the step 700, and/or where appropriate by the steps 730 and/or 820, allows the system to form, starting from this trajectory, a series of predictions able to provide the pilot with valuable predictive information on the state of the aircraft and the flight.

Figure 21:
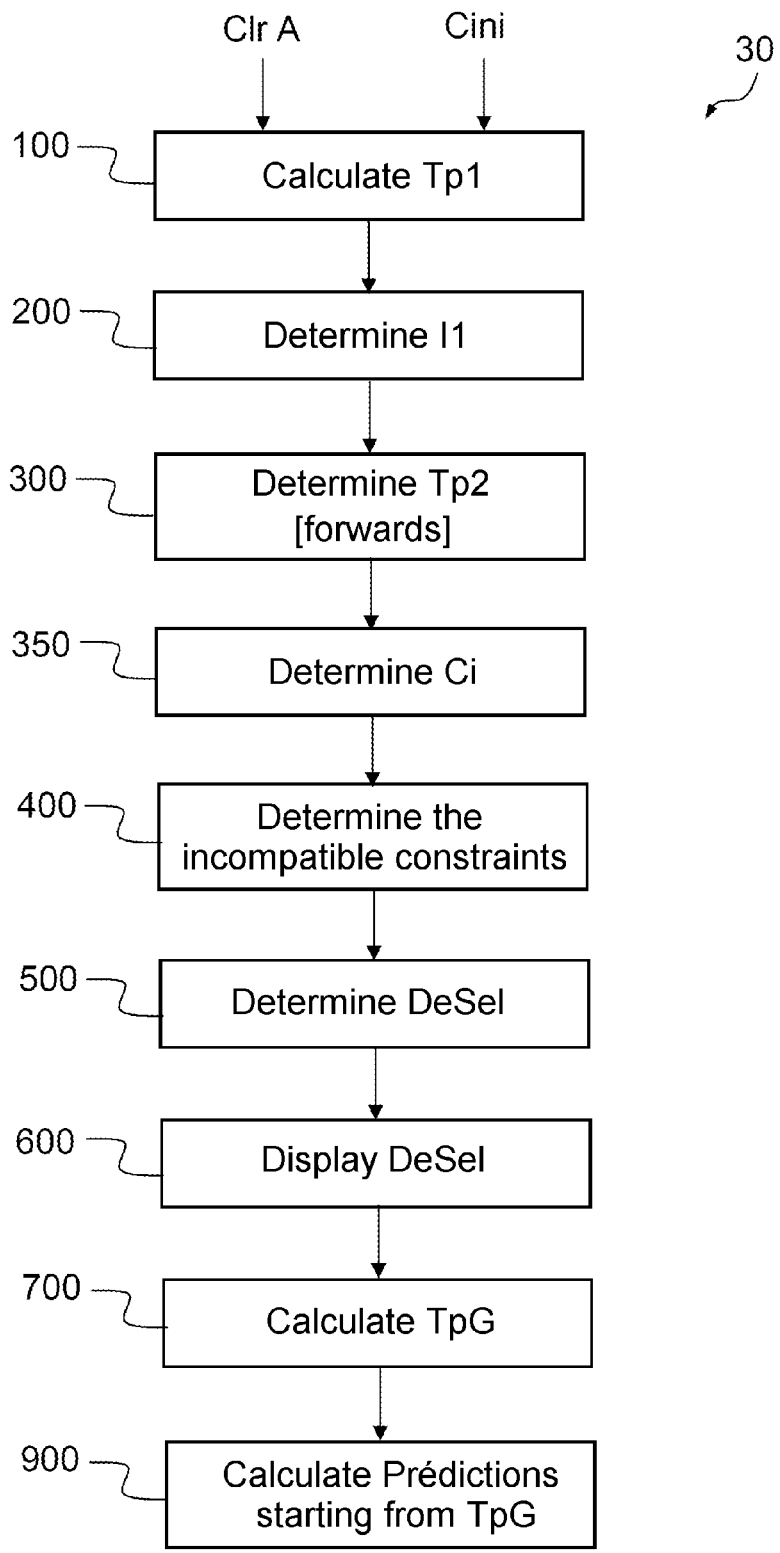
FIG. 21 illustrates another preferred embodiment of the method according to the invention.

Thus, according to one preferred embodiment illustrated in FIG. 21, the method according to the invention furthermore comprises a step 900 consisting in calculating predictions of state parameters of the aircraft based on a predicted global trajectory TpG.

Preferably, the state parameters of the aircraft comprise the predicted altitude of passage, the predicted speed of passage, the predicted remaining fuel.

Thus, the method 30 supplies to the pilot a frame of realistic predictions taking into account the part of the flight carried out in manual guidance mode.

Since the predicted fuel and the altitude predictions are more realistic, the situation of the aircraft is made safer, together with that of the other aircraft and air traffic control to whom the predictions are communicated is better informed of the real situation of the aircraft.

Figure 22:
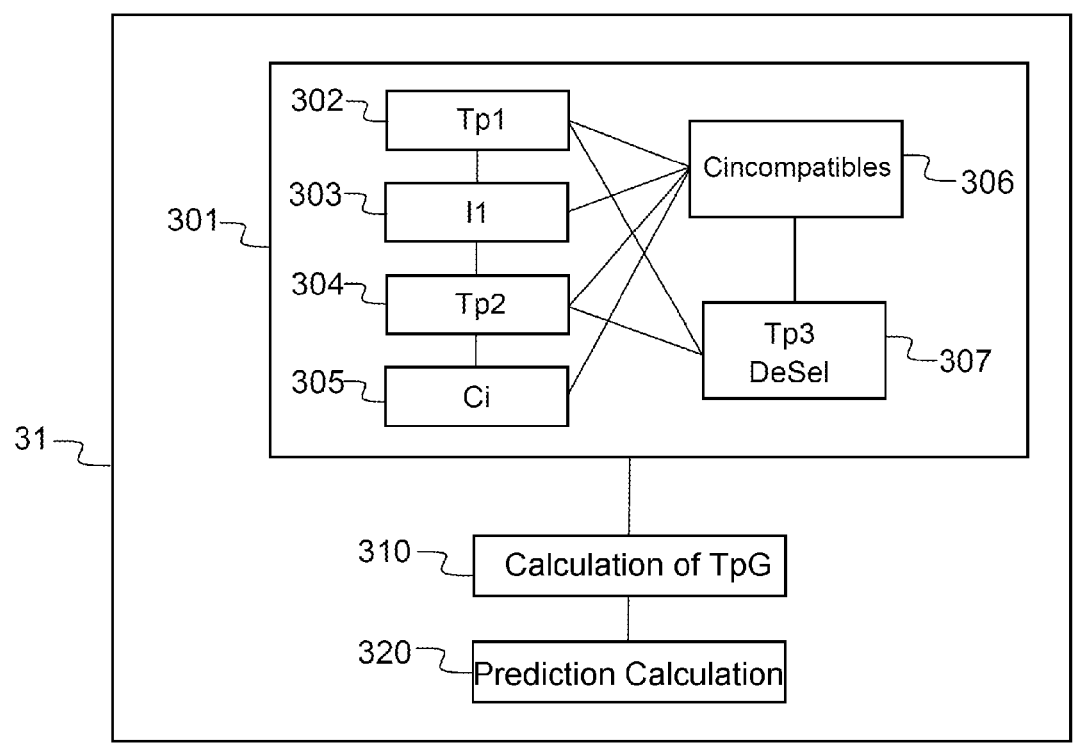
FIG. 22 shows schematically a device according to another aspect of the invention.

According to another aspect illustrated in FIG. 22, the invention relates to a device 31 for calculating predictions based on the determination of a switch-over vertical point DeSel from which an aircraft 101, having a current position and flying a current vertical trajectory according to a manual piloting mode having an altitude setpoint ClrA, denoted target altitude, loaded by the pilot, switches to a piloting mode guided by a flight management system FMS, in order to rejoin a predefined flight plan PV having a set Cini of initial altitude constraints, the said device comprising:
- a module 301 for calculating the switch-over vertical point DeSel comprising:
    - a module 302 for calculating a first predicted vertical trajectory Tp1 by integration of the dynamic flight equations starting from the current position of the aircraft, by extrapolating the current trajectory and by applying calculation hypotheses corresponding to the manual piloting mode of the aircraft,
    - a module 303 for determining a first point of intersection I1 between the first predicted trajectory Tp1 and the target altitude ClrA, having a first abscissa x1, the altitude constraints with an abscissa lower than the said first abscissa being denoted anterior constraints, the altitude constraints with an abscissa higher than the said first abscissa being denoted posterior constraints,
    - a module 304 for determining a second predicted trajectory Tp2 by forward integration of the dynamic flight equations starting from the said first intersection point I1 and by applying calculation hypotheses for a piloting mode guided by FMS.
    - a module 305 for determining a sub-set of altitude constraints to be complied with Ci indexed by an index i, the index 1 corresponding to the constraint closest to the current position of the aircraft, chosen from amongst the set Cini of initial altitude constraints, each altitude constraint to be complied with having an abscissa xi,
    - a module 306 for determining anterior constraints incompatible with the first predicted trajectory Tp1 and posterior constraints incompatible with the second predicted trajectory Tp2, a module 307 for determining the switch-over vertical point DeSel belonging to the first predicted vertical trajectory Tp1 based on any incompatible constraints, calculated as follows:
the switch-over vertical point DeSel is equal to the first point of intersection I1, when no constraint is incompatible,
the switch-over vertical point DeSel being equal to the intersection between the first predicted trajectory Tp1 and a predicted vertical trajectory Tp3 calculated by backward integration of the dynamic flight equations starting from an associated incompatible constraint, by applying calculation hypotheses for a piloting mode guided by FMS, when at least one altitude constraint is incompatible,
a module 310 for calculating a predicted global trajectory TpG based on the concatenation of at least two portions:
a first portion equal to the first predicted trajectory Tp1, up to the switch-over vertical point DeSel and
a second portion, starting from the switch-over vertical point DeSel, equal to:
the second predicted trajectory Tp2 when no altitude constraint is incompatible,
the third predicted trajectory Tp3 associated with the switch-over vertical point when at least one altitude constraint is incompatible.
a module (320) for calculating predictions of state parameters of the aircraft based on the predicted global trajectory (TpG).

According to one embodiment, the device 31, and hence the module 301 for calculating DeSel, is integrated into the FMS.

More particularly, according to one option, the module for calculating the trajectory 310 is integrated into the module TRAJ 120 of the FMS and the module for calculating predictions 320 is integrated into the module PRED 140 of the FMS.

According to another embodiment, the device 31 according to the invention, implementing the method according to the invention, is integrated into any type of computer performing a calculation of predictions, such as an EFB (Electronic Flight Bag), an onboard system for management of a tactical mission, a flight prediction computer of an air traffic control centre (TP for Trajectory Predictor), a touchscreen tablet incorporating means for the calculation of predictions, etc.

The invention also relates to a flight management system FMS comprising the device 31.

The invention claimed is:

1. A method for determining with a flight management system (FMS) that includes a computer a switch-over vertical point from which an aircraft, having a current position, and flying a current vertical trajectory according to a manual piloting mode having an altitude setpoint, denoted target altitude, loaded by a pilot, switches over to a piloting mode guided by the FMS, in order to rejoin a predefined flight plan having a set of initial altitude constraints, the method comprising the steps:
calculating a first predicted vertical trajectory by integration of dynamic flight equations starting from the current position of the aircraft, by extrapolating the current trajectory and by applying calculation hypotheses corresponding to the manual piloting mode for the aircraft,
determining a first point of intersection between the first predicted trajectory and the target altitude, having a first abscissa, the altitude constraints with an abscissa less than the said first abscissa being called anterior constraints, the altitude constraints with an abscissa greater than the said first abscissa being called posterior constraints,
determining a second predicted trajectory by forward integration of the dynamic flight equations starting from the said first intersection point and by applying calculation hypotheses for a piloting mode guided by the FMS,
determining a sub-set of altitude constraints to be complied with indexed by an index i, the index 1 corresponding to the constraint closest to the current position of the aircraft, chosen from amongst the set of initial altitude constraints, each altitude constraint to be complied with having an abscissa,
determining the anterior constraints incompatible with the first predicted trajectory and the posterior constraints incompatible with the second predicted trajectory,
determining the said switch-over vertical point belonging to the first predicted vertical trajectory, using any incompatible constraints, and as the intersection between the said first predicted vertical trajectory and a predicted vertical trajectory calculated by integration of the dynamic flight equations by applying calculation hypotheses for a piloting mode guided by the FMS, and
proposing to the pilot of the aircraft to switch from the manual piloting mode to the piloting mode guided by the FMS when the aircraft reaches said switch-over vertical point.

2. The method according to claim 1 in which the step for determining the switch-over vertical point comprises the sub-steps:
when no constraint is incompatible, the switch-over vertical point is equal to the first point of intersection,
when at least one altitude constraint is incompatible, determining the said switch-over vertical point as the intersection between the first predicted trajectory and a predicted vertical trajectory calculated by backward integration of the dynamic flight equations starting from an associated incompatible constraint, by applying calculation hypotheses for a piloting mode guided by the FMS.

3. The method according to claim 2 in which the step for determining the switch-over point comprises the sub-steps:
for each incompatible constraint:
determining a third associated predicted trajectory by backward integration of the dynamic flight equations starting from the associated incompatible constraint and by applying calculation hypotheses for a piloting mode guided by the FMS,
determining a second associated point of intersection corresponding to the intersection between the first predicted vertical trajectory and the third associated predicted trajectory,
determining the switch-over vertical point, equal to the second associated point of intersection closest to the current position of the aircraft.

4. The method according to claim 1 in which the manual piloting mode is chosen from the group: constant vertical speed managed; constant angle managed; constant altitude managed; and thrust managed.

5. The method according to claim 1 further comprising a step for graphical display of the switch-over vertical point.

6. The method according to claim 1 in which the aircraft is in a climbing phase and in which the calculation hypotheses for the piloting mode guided by the FMS incorporate an operational criterion of the Thrust Climb managed type or of the altitude hold type.

7. The method according to claim 1 in which the aircraft is in a descent phase and must rejoin a predetermined altitude profile and in which the calculation hypotheses for the piloting mode guided by the FMS incorporate an operational criterion that is a function of the position of the aircraft with respect to the predetermined altitude profile.

8. The method according to claim 6 in which the aircraft is situated below the predetermined altitude profile, and in which the operational criterion is of the constant vertical speed managed type or of the altitude hold type.

9. The method according to claim 6 in which the aircraft is situated above the predetermined altitude profile and in which the operational criterion is of the thrust managed (THRUST Idle Managed) type, the said criterion being adjustable by a positioning of airbrakes chosen from amongst the group: no airbrakes (no Airbrake); half-out airbrakes (½ Airbrake); and fully deployed airbrakes (full Airbrake).

10. The method according to claim 1, further comprising calculating a predicted global trajectory based on the concatenation of at least two portions:
a first portion equal to the first predicted trajectory, up to the switch-over vertical point and
a second portion, starting from the switch-over vertical point, equal to:
the second predicted trajectory when no altitude constraint is incompatible,
the third predicted trajectory associated with the switch-over vertical point when at least one altitude constraint is incompatible.

11. The method according to claim 1, further comprising the steps:
selecting a chosen point belonging to the first predicted trajectory
replacing the switch-over vertical point by the chosen point,
calculating a predicted global trajectory based on the concatenation of at least two portions:
a first portion equal to the first predicted trajectory, up to the chosen point,
a second portion, starting from the chosen point, corresponding to a trajectory calculated by forward integration of the dynamic flight equations according to a piloting mode guided by the FMS.

12. The method according to claim 11 in which the step for selection of the chosen point is operated by the pilot.

13. The method according to claim 1 in which:
the aircraft is in a descent phase and must rejoin a predetermined altitude profile, and further comprising the steps:
determining a third point equal to the intersection between the first predicted trajectory and the said predetermined altitude profile,
when the said third point is reached prior to the calculated switch-over vertical point:
calculating a predicted global trajectory based on the concatenation of at least two portions:
a first portion equal to the first predicted trajectory, up to the third point,
a second portion, starting from the third point, corresponding to a trajectory calculated by integration of the dynamic flight equations according to a piloting mode guided by the FMS following the predetermined altitude profile.

14. The method according to claim 10, further comprising a step consisting in calculating predictions of state parameters of the aircraft from a predicted global trajectory.

15. The method according to claim 14 in which the state parameters of the aircraft comprise a predicted altitude of passage, a predicted speed of passage, and a predicted remaining fuel.

16. A device configured for calculating predictions based on the determination of a switch-over vertical point from which an aircraft, having a current position, and flying a current vertical trajectory according to a manual piloting mode having an altitude setpoint, denoted target altitude, loaded by the pilot, switches to a piloting mode guided by a flight management system (FMS) that includes a computer, in order to rejoin a predefined flight plan having a set of initial altitude constraints, the device comprising:
a module for calculation of the switch-over vertical point included in the component performing the predictions of the FMS comprising:
a module for calculating a first predicted vertical trajectory by integration of dynamic flight equations starting from the current position of the aircraft, by extrapolating the current trajectory and by applying calculation hypotheses corresponding to the manual piloting mode of the aircraft,
a module for determining a first point of intersection between the first predicted trajectory and the target altitude, having a first abscissa, the altitude constraints with an abscissa less than the said first abscissa being denoted anterior constraints, the altitude constraints with an abscissa greater than the said first abscissa being denoted posterior constraints,
a module for determining a second predicted trajectory by forward integration of the dynamic flight equations starting from the said first intersection point and by applying calculation hypotheses for a piloting mode guided by the FMS,
a module for determining a sub-set of altitude constraints to be complied with indexed by an index i, the index 1 corresponding to the constraint closest to the current position of the aircraft, chosen from amongst the set of initial altitude constraints, each altitude constraint to be complied with having an abscissa,
a module for determining the anterior constraints incompatible with the first predicted trajectory and the posterior constraints incompatible with the second predicted trajectory,
a module for determining the switch-over vertical point belonging to the first predicted vertical trajectory, using any incompatible constraints,
the switch-over vertical point being equal to the first point of intersection, when no constraint is incompatible,
the switch-over vertical point being equal to the intersection between the first predicted trajectory and a predicted vertical trajectory calculated by backward integration of the dynamic flight equations starting from an associated incompatible constraint, by applying calculation hypotheses for a piloting mode guided by the FMS, when at least one altitude constraint is incompatible,
a module for calculating a predicted global trajectory based on the concatenation of at least two portions:
a first portion equal to the first predicted trajectory, up to the switch-over vertical point and
a second portion, starting from the switch-over vertical point, equal to:
the second predicted trajectory when no altitude constraint is incompatible, the third predicted trajectory associated with the switch-over vertical point when at least one altitude constraint is incompatible, a module for calculating predictions of state parameters of the aircraft based on the predicted global trajectory, and a display configured to display the switch-over vertical point.

17. A flight management system comprising the device claim 16.

18. A computer programme product, the computer programme comprising code instructions allowing the steps of the method according to claim 1 to be carried out.

* * * * *